(12) United States Patent
Fukuda

(10) Patent No.: US 7,203,156 B1
(45) Date of Patent: Apr. 10, 2007

(54) COMMUNICATION SYSTEM, BASE STATION APPARATUS, COMMUNICATION TERMINAL APPARATUS AND COMMUNICATION METHOD

(75) Inventor: Kunio Fukuda, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/403,312

(22) PCT Filed: Feb. 26, 1999

(86) PCT No.: PCT/JP99/00956

§ 371 (c)(1),
(2), (4) Date: Jan. 21, 2000

(87) PCT Pub. No.: WO99/44316

PCT Pub. Date: Sep. 2, 1999

(30) Foreign Application Priority Data

| Feb. 26, 1998 | (JP) | ................................. 10-045954 |
| Apr. 8, 1998 | (JP) | ................................. 10-096296 |

(51) Int. Cl.
| H04J 11/00 | (2006.01) |
| H04J 1/00 | (2006.01) |
| H04J 3/16 | (2006.01) |
| H04J 3/22 | (2006.01) |
| H04Q 7/00 | (2006.01) |

(52) U.S. Cl. ...................... 370/203; 370/328; 370/343; 370/468; 370/480

(58) Field of Classification Search ................ 370/343, 370/344, 468, 480, 203, 206, 208, 328; 375/260, 375/147, 316
See application file for complete search history.

(56) References Cited

U.S. PATENT DOCUMENTS

| 5,471,464 A | 11/1995 | Ikeda ......................... 320/203 |
| 5,541,552 A | 7/1996 | Suzuki et al. ............... 375/327 |

(Continued)

FOREIGN PATENT DOCUMENTS

WO          WO97/41645          11/1997

(Continued)

*Primary Examiner*—Kevin C. Harper
(74) *Attorney, Agent, or Firm*—Lerner, David, Littenberg, Krumholz & Mentlik, LLP

(57) ABSTRACT

In carrying out bidirectional communication with a base station device, one frame is prescribed for each predetermined time period Tf and a plurality of time slots are formed in one frame. In slots T1, T2, . . . , Tn of an uplink period Tu, communication of a down link from the base station device to a communication terminal device is carried out by using a multi-carrier signal having data dispersed to m units of subcarriers for transmission (where m is an integer not smaller than 2), and communication of an up link from the communication terminal device to the base station is carried out by using a multi-carrier signal having data dispersed to j units of subcarriers for transmission (where j is an integer smaller than m) or a multi-carrier signal having data dispersed to m units of subcarriers for transmission.

14 Claims, 17 Drawing Sheets

U.S. PATENT DOCUMENTS

| | | | |
|---|---|---|---|
| 5,675,572 A | 10/1997 | Hidejima et al. | 370/206 |
| 5,680,394 A | 10/1997 | Bingham et al. | 370/294 |
| 5,726,978 A * | 3/1998 | Frodigh et al. | 370/252 |
| 5,790,516 A * | 8/1998 | Gudmundson et al. | 370/210 |
| 5,802,044 A * | 9/1998 | Baum et al. | 370/330 |
| 5,805,567 A * | 9/1998 | Ramesh | 370/204 |
| 5,805,581 A * | 9/1998 | Uchida et al. | 370/335 |
| 5,903,614 A * | 5/1999 | Suzuki et al. | 375/340 |
| 5,940,143 A * | 8/1999 | Igarashi et al. | 348/678 |
| 6,018,528 A * | 1/2000 | Gitlin et al. | 370/436 |
| 6,256,356 B1 * | 7/2001 | Suzuki | 375/260 |
| 6,400,679 B1 * | 6/2002 | Suzuki | 370/208 |

FOREIGN PATENT DOCUMENTS

| | | | |
|---|---|---|---|
| WO | WO 98/02982 | * | 1/1998 |

* cited by examiner

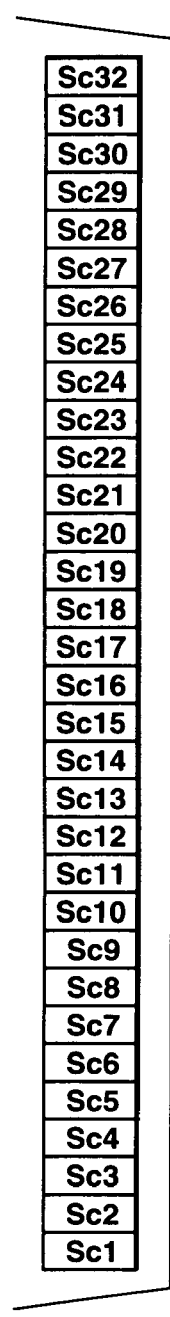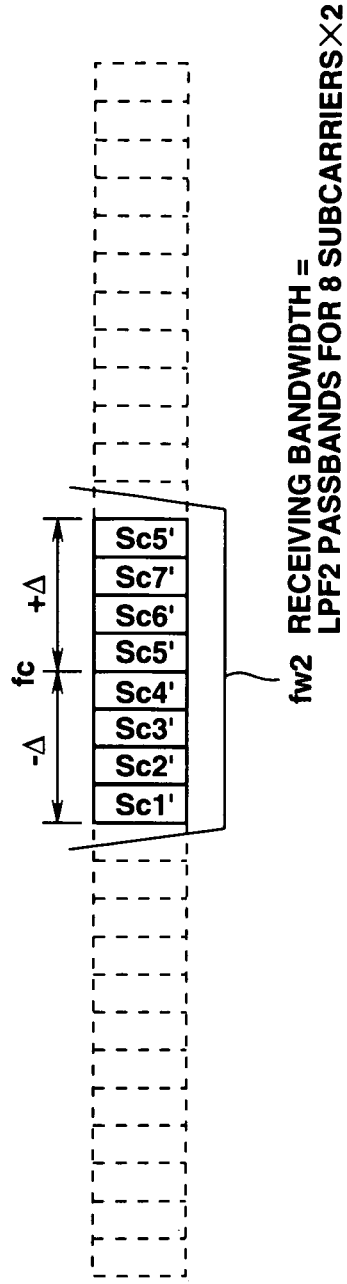
FIG.17A EXAMPLE OF HIGH-SPEED ACCESS
FIG.17B EXAMPLE OF LOW-SPEED ACCESS

COMMUNICATION SYSTEM, BASE STATION APPARATUS, COMMUNICATION TERMINAL APPARATUS AND COMMUNICATION METHOD

TECHNICAL FIELD

This invention relates to a communication system, a base station device, a communication terminal device and a communication method suitably applied to data communication on a mobile unit, particularly radio communication of multi-carrier signals.

BACKGROUND ART

Conventionally, a data communication system for mobile communication, referred to as a multimedia mobile access system (MMAC), has been proposed. This access system is a high-speed radio access system which is seamlessly connectable to an optical fiber network (BISDN). In this access system, a relatively high frequency band of 5 GHz or the like and a transmission rate of approximately 30 Mbps are used, and a TDMA (time division multiple access)/TDD (time division duplex) mode is used as an access mode.

Meanwhile, in allocating transmission data to a plurality of subcarriers for carrying out radio transmission by applying the multi-carrier signal transmission mode referred to as an orthogonal frequency division multiplex (OFDM) mode as in the MMAC system, there is a problem that a large peak power ratio of the transmission power to the average power is generated. For example, if the number of subcarriers is 32, the ratio is simply equal to 10 log 32=15 dB. Therefore, in the case where the multi-carrier signal transmission mode is employed, it is necessary to use a power amplifier having broad linearity as a power amplifier of a transmission section of a transmission device. Thus, in a small-size terminal unit which has low power efficiency and is required to have low dissipation power for battery driving, there is an extremely large burden on the unit.

DISCLOSURE OF THE INVENTION

In view of the foregoing status of the art, it is an object of the present invention to provide a communication system, a base station device, a communication terminal device and a communication method which enable efficient processing in bidirectional transmission of multi-carrier signals.

A communication system according to the present invention includes: a base station device having transmission means for carrying out communication of a down link to a communication terminal device by using a multi-carrier signal having data dispersed to a plurality of subcarriers for transmission, and receiving means for receiving a single-carrier signal transmitted from the communication terminal device and demodulating the data thereof; and a communication terminal device having transmission means for carrying out communication of an up link to the base station device by using a single-carrier signal, and receiving means for receiving a multi-carrier signal having data dispersed to a plurality of subcarriers transmitted from the base station device and demodulating the received data.

Also, a communication system according to the present invention includes: a base station device having transmission means for carrying out communication of a down link to a communication terminal device by using a multi-carrier signal having data dispersed to a plurality of subcarriers for transmission, and receiving means for receiving a multi-carrier signal having data dispersed to a plurality of subcarriers or a single-carrier signal transmitted from the communication terminal device and demodulating the data thereof; a first communication terminal device having transmission means for carrying out communication of an up link to the base station device by using a multi-carrier signal having data dispersed to a plurality of subcarriers for transmission, and receiving means for receiving a multi-carrier signal having data dispersed to a plurality of subcarriers transmitted from the base station device and demodulating the received data; and a second communication terminal device having transmission means for carrying out communication of an up link to the base station device by using a single-carrier signal, and receiving means for receiving a multi-carrier signal having data dispersed to a plurality of subcarriers transmitted from the base station device and demodulating the received data.

Also, a communication system according to the present invention includes: a base station device having transmission means for carrying out communication of a down link to a communication terminal device by using a multi-carrier signal having data dispersed to m units of subcarriers for transmission (where m is an integer not smaller than 2), and receiving means for receiving a multi-carrier signal having data dispersed to j units of subcarriers (where j is an integer smaller than m) transmitted from the communication terminal device and demodulating the data thereof; and a communication terminal device having transmission means for carrying out communication of an up link to the base station device by using a multi-carrier signal having data dispersed to j units of subcarriers for transmission, and receiving means for receiving a multi-carrier signal having data dispersed to m units of subcarriers transmitted from the base station device and demodulating the received data.

Also, a communication system according to the present invention includes: a base station device having transmission means for carrying out communication of a down link to a communication terminal device by using a multi-carrier signal having data dispersed to m units of subcarriers for transmission (where m is an integer not smaller than 2), and receiving means for receiving a multi-carrier signal having data dispersed to m or j units of subcarriers (where j is an integer smaller than m) transmitted from the communication terminal device and demodulating the data thereof; a first communication terminal device having transmission means for carrying out communication of an up link to the base station device by using a multi-carrier signal having data dispersed to m units of subcarriers for transmission, and receiving means for receiving a multi-carrier signal having data dispersed to m units of subcarriers transmitted from the base station device and demodulating the received data; and a second communication terminal device having transmission means for carrying out communication of an up link to the base station device by using a multi-carrier signal having data dispersed to j units of subcarriers for transmission, and receiving means for receiving a multi-carrier signal having data dispersed to m units of subcarriers transmitted from the base station device and demodulating the received data.

Also, a communication system according to the present invention includes: a base station device having transmission means for carrying out communication of a down link to a communication terminal device by using a multi-carrier signal having data dispersed to m units of subcarriers for transmission (where m is an integer not smaller than 2), and receiving means for receiving a multi-carrier signal having data dispersed to m or j units of subcarriers (where j is an integer smaller than m) or a single-carrier signal transmitted from the communication terminal device and demodulating the data thereof; a first communication terminal device having transmission means for carrying out communication of an up link to the base station device by using a multi-carrier signal having data dispersed to m units of subcarriers for transmission, and receiving means for receiving a multi-carrier signal having data dispersed to m units of subcarriers transmitted from the base station device and demodulating the received data; a second communication terminal device having transmission means for carrying out communication of an up link to the base station device by using a multi-carrier signal having data dispersed to j units of subcarriers for transmission, and receiving means for receiving a multi-carrier signal having data dispersed to m units of subcarriers transmitted from the base station device and demodulating the received data; and a third communication terminal device having transmission means for carrying out communication of an up link to the base station device by using single-carrier, and receiving means for receiving a multi-carrier signal having data dispersed to a plurality of subcarriers transmitted from the base station device and demodulating the received data.

According to the present invention, there is provided a base station device for carrying out bidirectional data communication with a communication terminal device. The base station device includes transmission means for carrying out communication of a down link to the communication terminal device by using a multi-carrier signal having data dispersed to a plurality of subcarriers for transmission, and receiving means for receiving a single-carrier signal transmitted from the communication terminal device and demodulating the data thereof.

Also, according to the present invention, there is provided a base station device for carrying out bidirectional data communication with a communication terminal device. The base station device includes transmission means for carrying out communication of a down link to the communication terminal device by using a multi-carrier signal having data dispersed to a plurality of subcarriers for transmission, and receiving means for receiving a multi-carrier signal having data dispersed to a plurality of subcarriers or a single-carrier signal transmitted from the communication terminal device and demodulating the data thereof.

Also, according to the present invention, there is provided a base station device for carrying out bidirectional data communication with a communication terminal device. The base station device includes transmission means for carrying out communication of a down link to the communication terminal device by using a multi-carrier signal having data dispersed to m units of subcarriers for transmission (where m is an integer not smaller than 2), and receiving means for receiving a multi-carrier signal having data dispersed to j units of subcarriers (where j is an integer smaller than m) transmitted from the communication terminal device and demodulating the data thereof.

Also, according to the present invention, there is provided a base station device for carrying out bidirectional data communication with a communication terminal device. The base station device includes transmission means for carrying out communication of a down link to the communication terminal device by using a multi-carrier signal having data dispersed to m units of subcarriers for transmission (where m is an integer not smaller than 2), and receiving means for receiving a multi-carrier signal having data dispersed to m or j units of subcarriers (where j is an integer smaller than m) transmitted from the communication terminal device and demodulating the data thereof.

Moreover, according to the present invention, there is provided a base station device for carrying out bidirectional data communication with a communication terminal device. The base station device includes transmission means for carrying out communication of a down link to the communication terminal device by using a multi-carrier signal having data dispersed to m units of subcarriers for transmission (where m is an integer not smaller than 2), and receiving means for receiving a multi-carrier signal having data dispersed to m or j units of subcarriers (where j is an integer smaller than m) or a single-carrier signal transmitted from the communication terminal device and demodulating the data thereof.

According to the present invention, there is provided a communication terminal device for carrying out bidirectional communication with a base station device. The communication terminal device includes transmission means for carrying out communication of an up link to the base station device by using a single-carrier signal, and receiving means for receiving a multi-carrier signal having data dispersed to a plurality of subcarriers transmitted from the base station device and demodulating the received data.

Also, according to the present invention, there is provided a communication terminal device for carrying out bidirectional communication with a base station device. The communication terminal device includes transmission means for carrying out communication of an up link to the base station device by using a multi-carrier signal having data dispersed to j units of subcarriers for transmission, and receiving means for receiving a multi-carrier signal having data dispersed to m units of subcarriers transmitted from the base station device and demodulating the received data.

According to the present invention, in a communication method for carrying out bidirectional communication with a base station device, communication of a down link from the base station device to a communication terminal device is carried out by using a multi-carrier signal having data dispersed to a plurality of subcarriers for transmission, and communication of an up link from the communication terminal device to the base station device is carried out by using a single-carrier signal.

Also, according to the present invention, in a communication method for carrying out bidirectional communication with a base station device, communication of a down link from the base station device to a communication terminal device is carried out by using a multi-carrier signal having data dispersed to a plurality of subcarriers for transmission, and communication of an up link from the communication terminal device to the base station device is carried out by using a multi-carrier signal having data dispersed to a plurality of subcarriers for transmission or a single-carrier signal.

Also, according to the present invention, in a communication method for carrying out bidirectional communication with a base station device, communication of a down link from the base station device to a communication terminal device is carried out by using a multi-carrier signal having data dispersed to m units of subcarriers for transmission (where m is an integer not smaller than 2), and communication of an up link from the communication terminal device to the base station device is carried out by using a multi-carrier signal having data dispersed to j units of subcarriers for transmission (where j is an integer smaller than m).

Also, according to the present invention, in a communication method for carrying out bidirectional communication with a base station device, communication of a down link from the base station device to a communication terminal device is carried out by using a multi-carrier signal having data dispersed to m units of subcarriers for transmission (where m is an integer not smaller than 2), and communication of an up link from the communication terminal device to the base station device is carried out by using a multi-carrier signal having data dispersed to j units of subcarriers for transmission (where j is an integer smaller than m) or a multi-carrier signal having data dispersed to m units of subcarriers.

Also, according to the present invention, in a communication method for carrying out bidirectional communication with a base station device, communication of a down link from the base station device to a communication terminal device is carried out by using a multi-carrier signal having data dispersed to m units of subcarriers for transmission (where m is an integer not smaller than 2), and communication of an up link from the communication terminal device to the base station device is carried out by using a multi-carrier signal having data dispersed to j units of subcarriers for transmission or a single-carrier signal.

Moreover, according to the present invention, in a communication method for carrying out bidirectional communication with a base station device, communication of a down link from the base station device to a communication terminal device is carried out by using a multi-carrier signal having data dispersed to m units of subcarriers for transmission (where m is an integer not smaller than 2), and communication of an up link from the communication terminal device to the base station device is carried out by using a multi-carrier signal having data dispersed to m units of subcarriers for transmission, a multi-carrier signal having data dispersed to j units of subcarriers for transmission (where j is an integer smaller than m) or a signal-carrier signal.

BRIEF DESCRIPTION OF THE DRAWINGS

FIGS. 17A and 17B are explanatory views showing a receiving band in the base station device shown in FIG. 16.

BEST MODE FOR CARRYING OUT THE INVENTION

Figure 1:
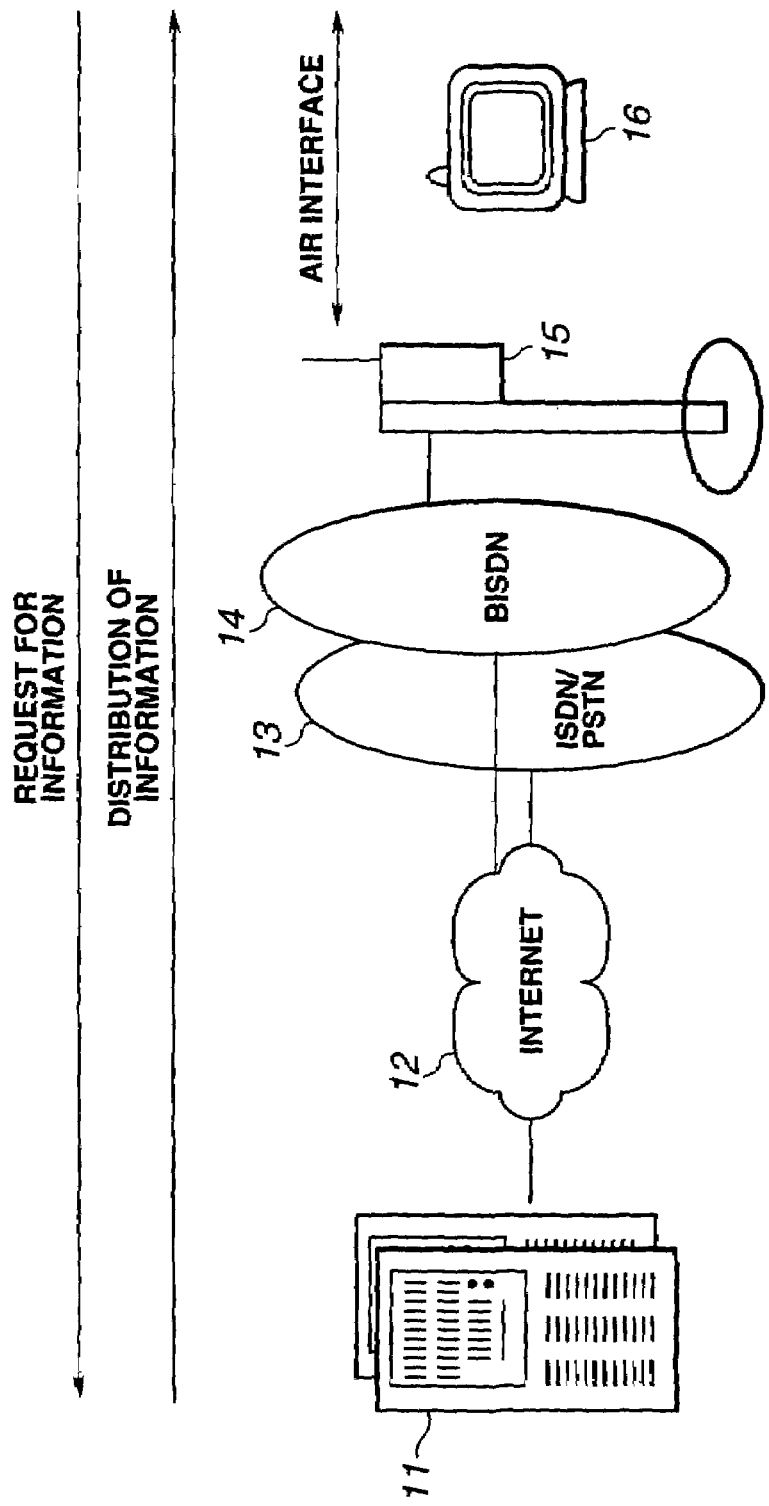
FIG. 1 shows the structure of a data communication system according to the present invention.

The present invention is applied to a data communication system having the structure as shown in FIG. 1, for example.

The data communication system shown in FIG. 1 is a data communication system for mobile communication referred to as a multimedia mobile access system (MMAC). This access system is a high-speed radio access system which is seamlessly connectable to an optical fiber network (BISDN or Broadband Aspects of Integrated Services Digital Network). In this access system, a relatively high frequency band of 5 GHz or the like and a transmission rate of approximately 30 Mbps are used, and a TDMA (time division multiple access)/TDD (time division duplex) mode is used as an access mode.

The data communication system shown in FIG. 1 is adapted for providing a service called IP (Internet Protocol) connection for connection to the Internet. The data communication system includes various contents servers 11 connected to the Internet 12, and an MMAC base station device 15 for carrying out communication through an ISDN circuit (or ordinary telephone line) 13 or an optical fiber network 14. The base station device 15 is connected to the ISDN circuit 13 or the optical fiber network 14 by a user network interface (UNI).

The MMAC base station device 15 carries out radio communication with a portable information terminal device 16 in accordance with the above-described transmission mode, and relays communication between the portable information terminal device 16 and the circuits 13, 14 connected to the base station device 15.

Figure 2:
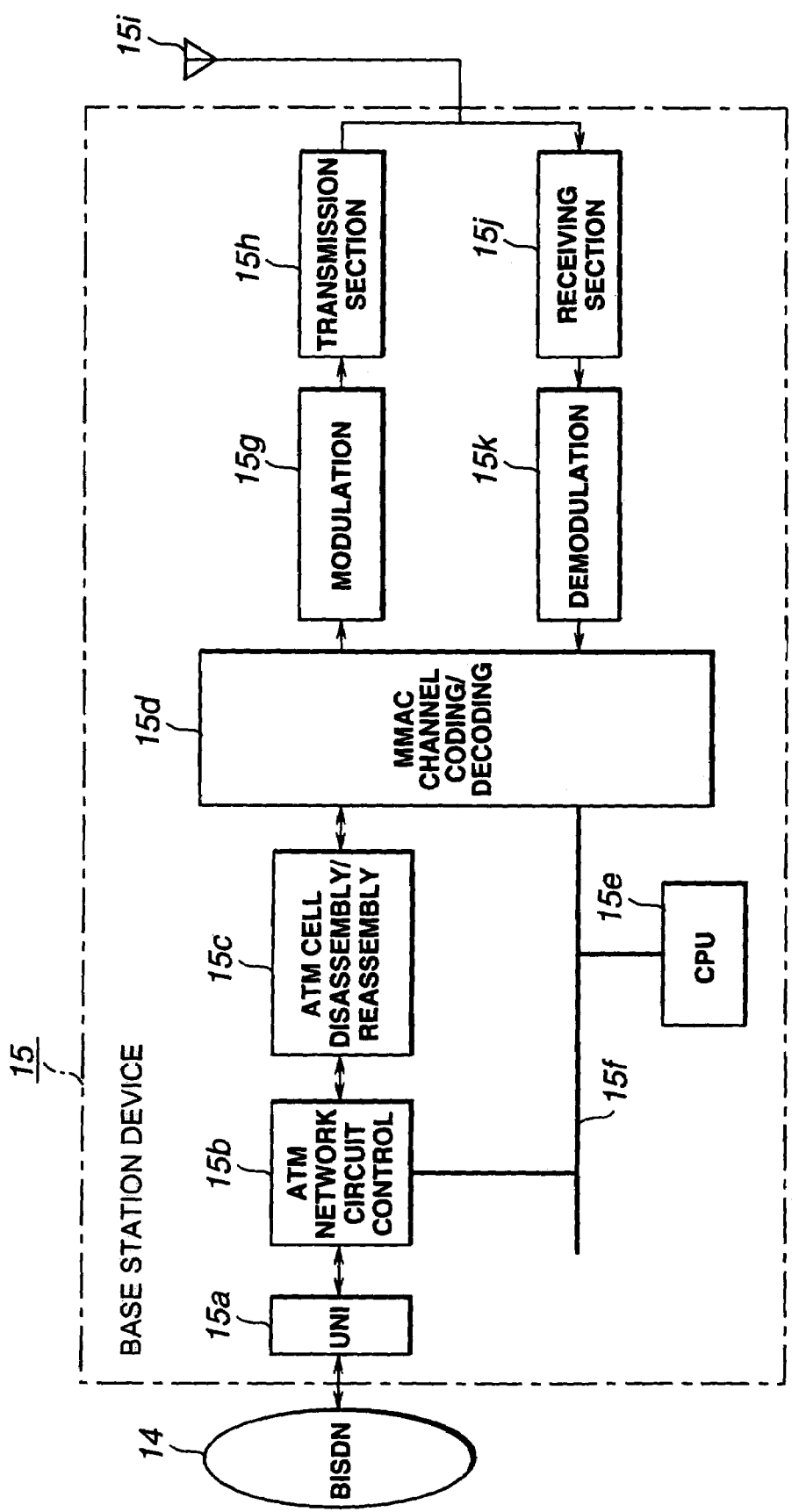
FIG. 2 is a block diagram showing the structure of an MMAC base station device in the data communication system.

The MMAC base station device 15 has the structure as shown in FIG. 2, for example. The MMAC base station device 15 shown in FIG. 2 includes an ATM network circuit control section 15b connected to the optical fiber network 14 where communication is carried out in an asynchronous transfer mode (ATM) through an interface section 15a, an MMAC channel coding/decoding section 15d connected to the ATM network circuit control section 15b through an ATM cell disassembly/reassembly section 15c, a central processing unit (CPU) 15e connected to the ATM network circuit control section 15b and the MMAC channel coding/decoding section 15d through a bus line 15f, a transmission section 15h connected to the MMAC channel coding/decoding section 15d through a modulation section 15g, a receiving section 15j connected to the MMAC channel coding/decoding section 15d through a demodulation section 15k, and an antenna 15i connected to the transmission section 15h and the receiving section 15j.

In this MMAC base station device 15, the interface section 15a is a user network interface (UNI) connected to the optical fiber network 14, and multiplexes data (ATM cell) transmitted in the ATM.

The ATM network circuit control section 15b connected to the interface section 15a carries out circuit control such as call connection with the ATM network. The ATM cell disassembly/reassembly section 15c connected to the ATM network circuit control section 15b carries out disassembly of an ATM cell from the ATM network side and reassembly of an ATM cell to be transmitted to the network side.

The data from the ATM network side, resolved by the ATM cell disassembly/reassembly section 1c, is sent to the MMAC channel coding/decoding section 15d, where the data is decoded to an MMAC radio transmission format. The decoded data is modulated in accordance with QPSK modulation by the modulation section 15g, and transmission processing such as frequency conversion and amplification is carried out by the transmission section 15h. Then, the processed data is radio-transmitted to the terminal device from the antenna 15i.

On the other hand, a signal transmitted from the terminal device side is received by the receiving section 15j through the antenna 15i, and demodulation of the received data is carried out by the demodulation section 15k. The demodulated data is decoded by the MMAC channel coding/decoding section 15d and is then assembled into an ATM cell by the ATM cell disassembly/reassembly section 15c. The ATM cell is transmitted from the interface section 15a to the optical fiber network 14 under the control of the ATM network circuit control section 15b.

The processing in the MMAC base station device 15 is executed under the control of the central processing unit 15e through the bus line 15f.

Figure 3:
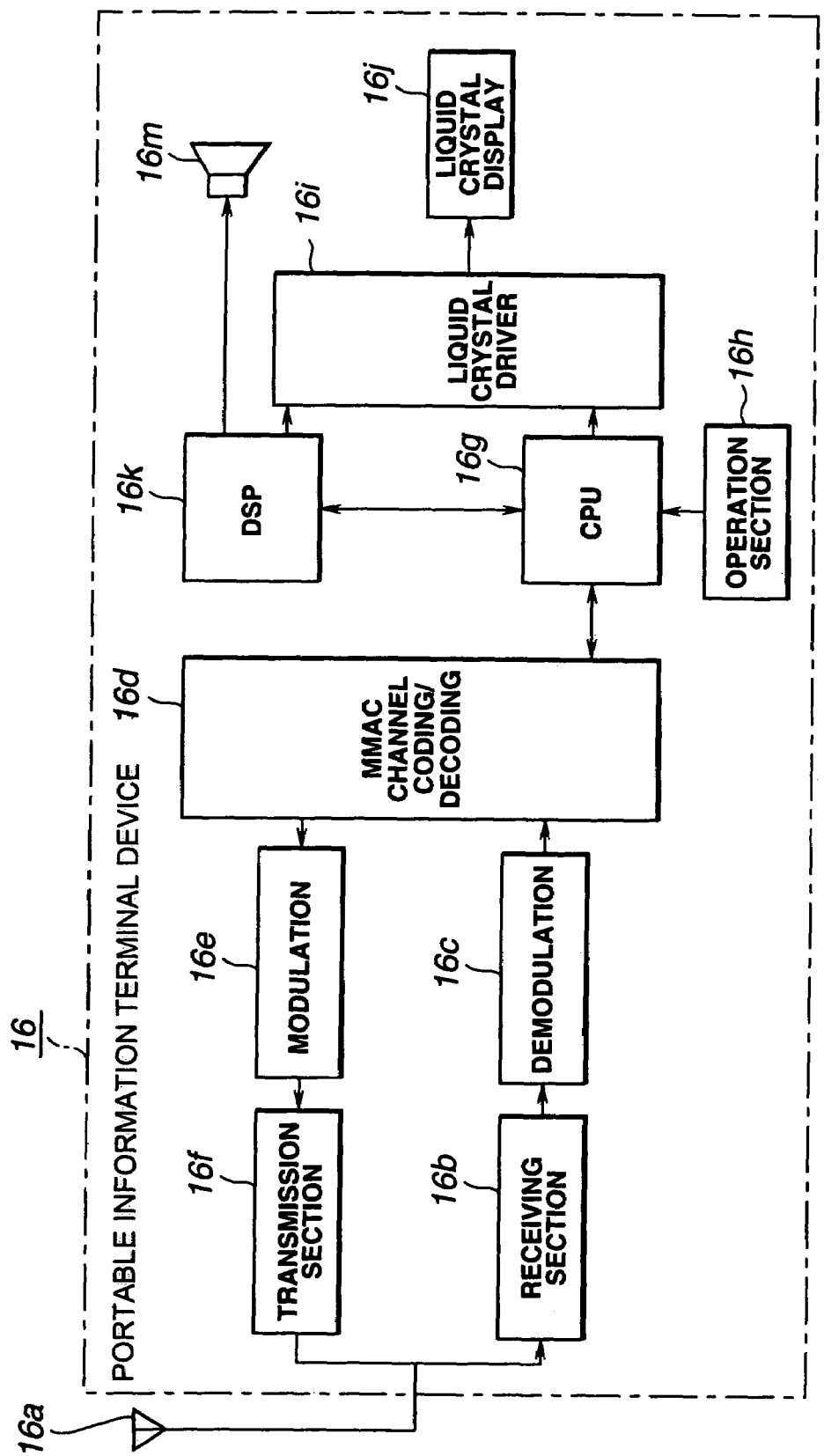
FIG. 3 is a block diagram showing the structure of an MMAC terminal device in the data communication system.

The portable information terminal device 16, which is the MMAC terminal device, has the structure as shown in FIG. 3, for example. The portable information terminal device 16 shown in FIG. 3 includes a receiving section 16b and a transmission section 16f which are connected to an antenna 16a, an MMAC channel coding/decoding section 16d connected to the receiving section 16b through a demodulation section 16c and connected to the transmission section 16f through a modulation section 16e, a central processing unit (CPU) 16g connected to the MMAC channel coding/decoding section 16d, an operation section 16h and a digital signal processing (DSP) section 16k which are connected to the central processing unit 16g, a liquid crystal driver 16i connected to the central processing unit 16g and the digital signal processing section 16k, a liquid crystal display 16j connected to the liquid crystal driver 16i, and a speaker 16m connected to the digital signal processing section 16k.

In this portable information terminal device 16, a signal transmitted from the MMAC base station device 15 is received by the receiving section 16b through the antenna 16a. The signal received by the receiving section 16b is demodulated by the demodulation section 16c and is supplied as received data to the MMAC channel coding/decoding section 16d. The MMAC channel coding/decoding section 16d carries out decoding processing from the MMAC radio transmission format. The data decoded by the MMAC channel coding/decoding section 16d is split into video data and audio data by the central processing unit 16g, and the split data are supplied to the digital signal processing section 16k. The digital signal processing section 16k carries out decoding processing in accordance with the MPEG-2 system. The video data included in the received data is processed for display by the digital signal processing section 16k and is then supplied to the liquid crystal driver 16i. The liquid crystal display 16j displays an image corresponding to the video data under the control of the central processing unit 16g. The audio data included in the received data is converted to an analog audio signal by the digital signal processing section 16k and is then outputted from the speaker 16m.

Also, in this portable information terminal device 16, transmission data generated in accordance with the operation of the operation section 16h connected to the central processing unit 16g is supplied to the MMAC channel coding/decoding section 16d. The MMAC channel coding/decoding section 16d codes the transmission data into the MMAC radio transmission format. The coded data is modulated in accordance with QPSK modulation by the modulation section 16e and is then radio-transmitted from the transmission section 16f to the MMAC base station device 15 through the antenna 16a.

By preparing the base station device 15 and the terminal device 16 as the MMAC system and then connecting these devices to the Internet 12, Internet broadcasts and the like from the various contents servers can be received by the terminal device 16. In the case of the MMAC system, since high-speed radio access is possible, dynamic image data can be received and displayed in the terminal device 16.

In this system, a multi-carrier signal transmission mode referred to as an orthogonal frequency division multiplex (OFDM) mode is applied to radio transmission. In the OFDM mode, multi-carrier signals such that a plurality of subcarriers (in this case, m units of subcarriers: m is a relatively large value such as 32) are arranged at a constant frequency interval within a predetermined bandwidth are employed. Each transmission data obtained by division is allocated to the plurality of subcarriers and each subcarrier is digitally modulated, thus dispersing the transmission data for transmission.

The structure for carrying out receiving processing and transmission processing in accordance with the OFDM mode will now be described.

Figure 4:
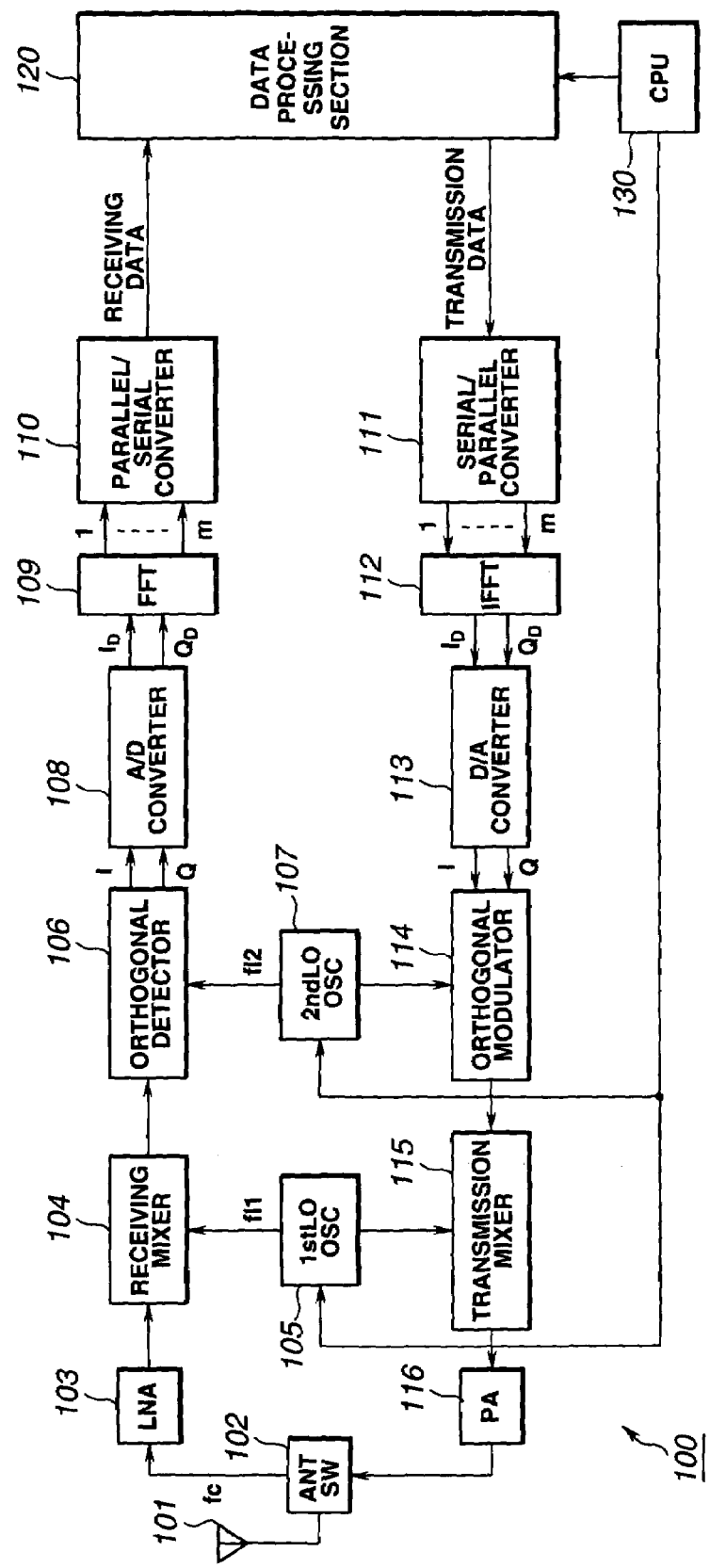
FIG. 4 is a block diagram showing the structure of essential portions of a communication terminal device used as the MMAC terminal device.

FIG. 4 is a block diagram showing a specific example of the structure of a receiving processing system and a transmission processing system of a communication terminal device 100 used as the portable information terminal device 16. In the communication terminal device 100 shown in FIG. 4, the receiving processing system corresponds to the receiving section 16b and the demodulation section 16c of the portable information terminal device 16. The receiving processing system includes a low-noise amplifier 103 connected to a transmission/receiving antenna 101 through an antenna switch 102, an orthogonal detector 106 connected to the low-noise amplifier 103 through a receiving mixer 104, a fast Fourier transform (FFT) circuit 109 connected to the orthogonal detector 106 through an A/D converter 108, and a parallel/serial converter 110 connected to the FFT circuit 109.

The transmission processing system corresponds to the modulation section 16e and the transmission section 16f of the portable information terminal device 16. The transmission processing system includes a serial/parallel converter 111 to which transmission data is supplied, an inverse fast Fourier transform (IFFT) circuit 112 connected to the serial/parallel converter 111, an orthogonal modulator 114 connected to the IFFT circuit 112 through a D/A converter 113, and a power amplifier 116 connected to the orthogonal modulator 114 through a transmission mixer 115. The power amplifier 116 is connected to the transmission/receiving antenna 101 through the antenna switch 102.

To the receiving mixer 104 and the transmission mixer 115, an oscillation output f11 of a first local oscillator 105 is supplied. To the orthogonal detector 106 and the orthogonal modulator 114, an oscillation output f12 of a second local oscillator 107 is supplied. The oscillation frequencies of the first local oscillator 105 and the second local oscillator 107 are controlled by a control section 130, which corresponds to the central processing unit 16g of the portable information terminal device 16.

In the receiving processing system in the communication terminal device 100 of such a structure, a received signal is inputted to the low-noise amplifier 103 from the transmission/receiving antenna 101 through the antenna switch 102. The low-noise amplifier 103 amplifies the received signal and supplies the signal to the receiving mixer 104. The receiving mixer 104 mixes the oscillation output f11 of the first local oscillator 105 with the received signal and converts the received signal of a predetermined frequency band to an intermediate-frequency signal.

The intermediate-frequency signal obtained by the receiving mixer 104 is supplied to the orthogonal detector 106. The orthogonal detector 106 mixes the oscillation output f12 of the second local oscillator 107 with the intermediate-frequency signal and performs orthogonal wave detection on the intermediate-frequency signal, thus splitting the signal into an I-component and a Q-component. The I-component and Q-component detected by the orthogonal detector 106 are converted to digital data $I_D$, $Q_D$ of the respective components by the A/D converter 108. The fast Fourier transform circuit 109 performs discrete Fourier transform with m points equal to the number of subcarriers by parallel processing with respect to the digital data $I_D$, $Q_D$ supplied from the orthogonal detector 106 through the A/D converter 108, and thus generates parallel data of m symbols.

The parallel data of m symbols generated by the fast Fourier transform circuit 109 is converted to one sequence of serial data by the parallel/serial converter 110, and this serial data is supplied as received data to a data processing section 120, which corresponds to the MMAC channel coding/decoding section 16d and the like of the portable information terminal device 16. Then, various kinds of data processing such as video display and audio reproduction are carried out.

On the other hand, in the transmission processing system in the communication terminal device 100, transmission data (serial data) supplied from the data processing section 120 is converted to m units of parallel data by the serial/parallel converter 111. The inverse fast Fourier transform circuit 112 performs inverse discrete Fourier transform with m points by parallel processing with respect to the m units of parallel data, and thus obtains digital baseband data $I_D$, $Q_D$ on the orthogonal time bases. The baseband data $I_D$, $Q_D$ are converted to the analog format by the D/A converter 113, thus obtaining analog signals of the I-component and Q-component.

The orthogonal modulator 114, to which the I-component and Q-component signals are supplied from the D/A converter 113, performs orthogonal modulation of the I-component and Q-component signals by using the oscillation output f12 of the second local oscillator 107 as a carrier wave. The signal orthogonally modulated by the orthogonal modulator 114 is mixed with the oscillation output f11 of the local oscillator 105 by the transmission mixer 115, thus frequency-converting the signal to a signal of a transmission frequency band. The frequency-converted signal is amplified by the power amplifier 116 and is then radio-transmitted from the antenna 101 through the antenna switch 102.

The structure of the transmission signal processed by the transmission processing system and the receiving processing system in the communication terminal device 100 will now be described.

Figure 5:
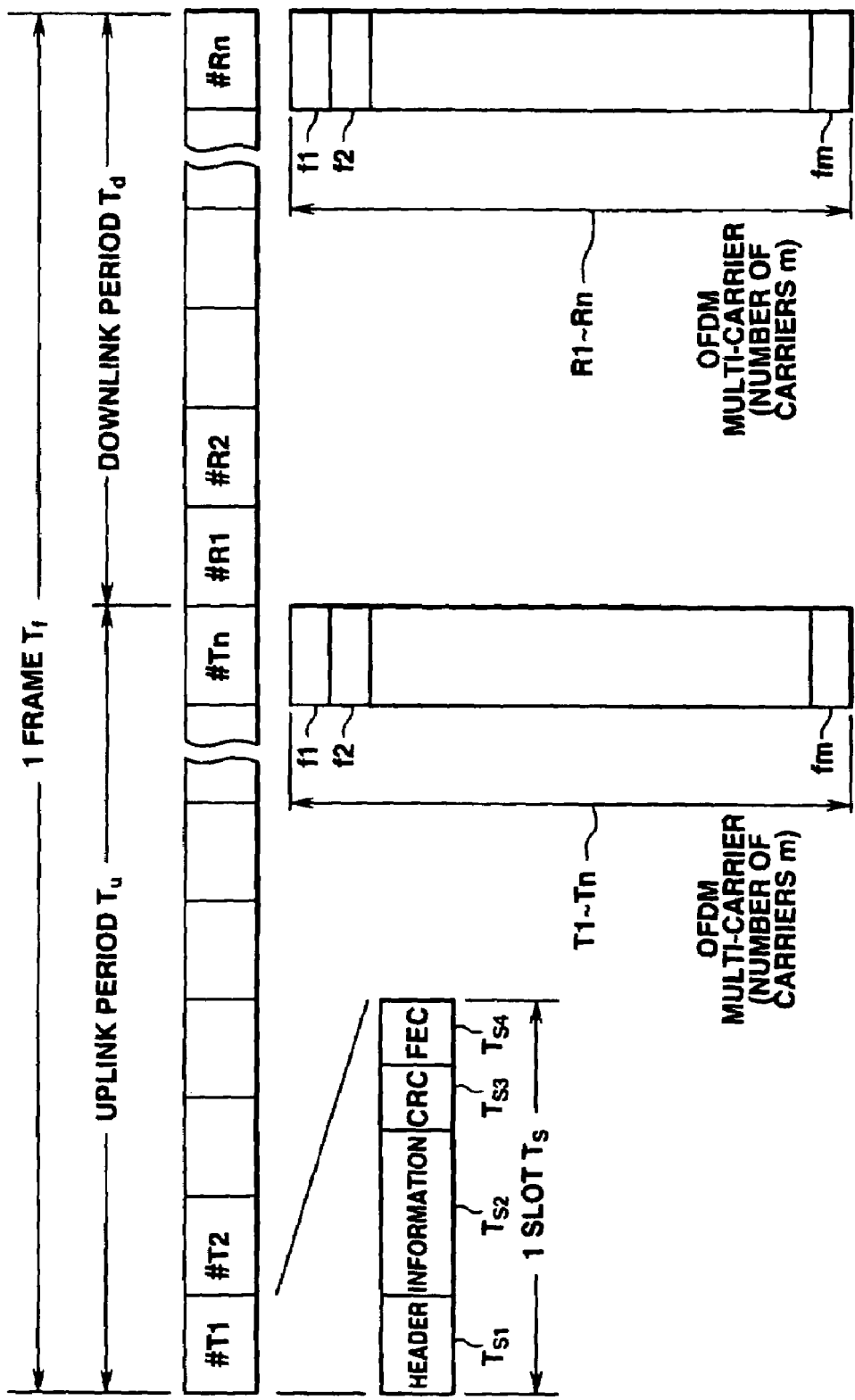
FIG. 5 is an explanatory view showing an exemplary frame structure in the data communication system.

In this MMAC system, data having the frame structure as shown in FIG. 5, for example, is transmitted.

In one frame, a plurality of time slots are formed. In each time slot, a header part Ts1, an information part Ts2, an error detection code (CRC or cyclic redundancy code) part Ts3, and an error correction code (FEC or forward error correction) part Ts4 are sequentially arranged. A predetermined number of slots T1, T2, . . . , Tn (where n is an arbitrary integer) in the former half of one frame are slots allocated to an uplink period Tu used for transmission from the terminal device 16 to the base station device 15. A predetermined number of slots R1, R2, . . . , Rn (where n is an arbitrary integer) in the latter half of one frame are slots allocated to a downlink period Td used for transmission from the base station device 15 to the terminal device 100.

Both in the slots of the uplink period and in the slots of the downlink period, transmission processing of multi-carrier signals of the same structure having m units of carriers is carried out.

Figure 6:
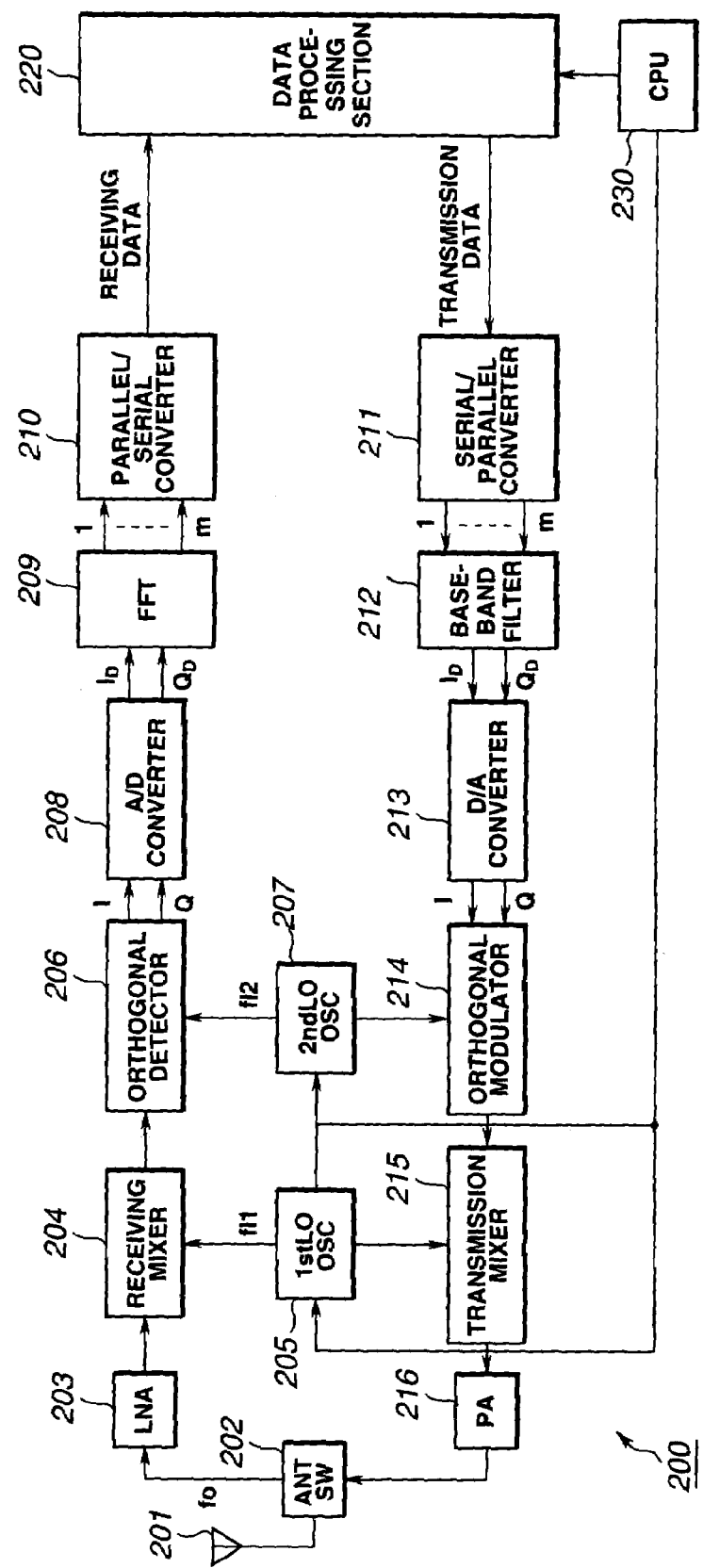
FIG. 6 is a block diagram showing the structure of essential portions of another communication terminal device used as the MMAC terminal device.

FIG. 6 is a block diagram showing a specific example of the structure of a receiving processing system and a transmission processing system of a communication terminal device 200 used as the portable information terminal device 16. In the communication terminal device 200 shown in FIG. 6, the receiving processing system corresponds to the receiving section 16b and the demodulation section 16c of the portable information terminal device 16. The receiving processing system includes a low-noise amplifier 203 connected to a transmission/receiving antenna 201 through an antenna switch 202, an orthogonal detector 206 connected to the low-noise amplifier 203 through a receiving mixer 204, a fast Fourier transform (FFT) circuit 209 connected to the orthogonal detector 206 through an A/D converter 208, and a parallel/serial converter 210 connected to the FFT circuit 209.

The transmission processing system corresponds to the modulation section 16e and the transmission section 16f of the portable information terminal device 16. The transmission processing system includes a serial/parallel converter 211 to which transmission data is supplied, a baseband filter 212 connected to the serial/parallel converter 211, an orthogonal modulator 214 connected to the baseband filter 212 through a D/A converter 213, and a power amplifier 216 connected to the orthogonal modulator 214 through a transmission mixer 215. The power amplifier 216 is connected to the transmission/receiving antenna 201 through the antenna switch 202.

To the receiving mixer 204 and the transmission mixer 215, an oscillation output f11 of a first local oscillator 205 is supplied. To the orthogonal detector 206 and the orthogonal modulator 214, an oscillation output f12 of a second local oscillator 207 is supplied. The oscillation frequencies of the first local oscillator 205 and the second local oscillator 207 are controlled by a control section 230, which corresponds to the central processing unit 16g of the portable information terminal device 16.

In the receiving processing system of this communication terminal device 200, a received signal is inputted to the low-noise amplifier 203 from the transmission/receiving antenna 201 through the antenna switch 202. The low-noise amplifier 203 amplifies the received signal and supplies the signal to the receiving mixer 204. The receiving mixer 204 mixes the oscillation output f11 of the first local oscillator 205 with the received signal and converts the received signal of a predetermined frequency band to an intermediate-frequency signal.

The intermediate-frequency signal obtained by the receiving mixer 204 is supplied to the orthogonal detector 206. The orthogonal detector 206 mixes the oscillation output f12 of the second local oscillator 207 with the intermediate-frequency signal and performs orthogonal wave detection on the intermediate-frequency signal, thus splitting the signal into an I-component and a Q-component. The I-component and Q-component detected by the orthogonal detector 206 are converted to digital data $I_D$, $Q_D$ of the respective components by the A/D converter 208. The fast Fourier transform circuit 209 performs discrete Fourier transform with m points equal to the number of subcarriers with respect to the digital data $I_D$, $Q_D$ supplied from the orthogonal detector 206 through the A/D converter 208, and thus generates parallel data of m symbols. The number of subcarriers m is an integer value not smaller than 2, and in general, the value m is a relatively large value such as 32.

The parallel data of m symbols generated by the fast Fourier transform circuit 209 is converted to one sequence of serial data by the parallel/serial converter 210, and this serial data is supplied as received data to a data processing section 220, which corresponds to the MMAC channel coding/decoding section 16d and the like of the portable information terminal device 16. Then, various kinds of data processing such as video display and audio reproduction are carried out.

On the other hand, in the transmission processing system in the communication terminal device 200, transmission data (serial data) supplied from the data processing section 220 is converted to two sequences of parallel data by the serial/parallel converter 211. The baseband filter 212 removes unwanted components from these two sequences of parallel data and thus generates digital baseband data $I_D$, $Q_D$ on the orthogonal time bases. The baseband data $I_D$, $Q_D$ are converted to the analog format by the D/A converter 213, thus obtaining analog signals of the I-component and Q-component.

The orthogonal modulator 214, to which the I-component and Q-component signals are supplied from the D/A converter 213, performs orthogonal modulation of the I-component and Q-component signals by using the oscillation output f12 of the second local oscillator 207 as a carrier wave. The signal orthogonally modulated by the orthogonal modulator 214 is mixed with the oscillation output f11 of the local oscillator 205 by the transmission mixer 215, thus frequency-converting the signal to a signal of a transmission frequency band. The frequency-converted signal is amplified by the power amplifier 216 and is then radio-transmitted from the antenna 201 through the antenna switch 202.

The communication terminal device 200 differs from the communication terminal device 100 shown in FIG. 4 in that digital baseband data $I_D$, $Q_D$ are generated by the baseband filter 212 in the transmission processing system.

The structure of the transmission signal which is radio-transmitted between the communication terminal device 200 of such a structure and the base station device 15 will now be described.

Figure 7:
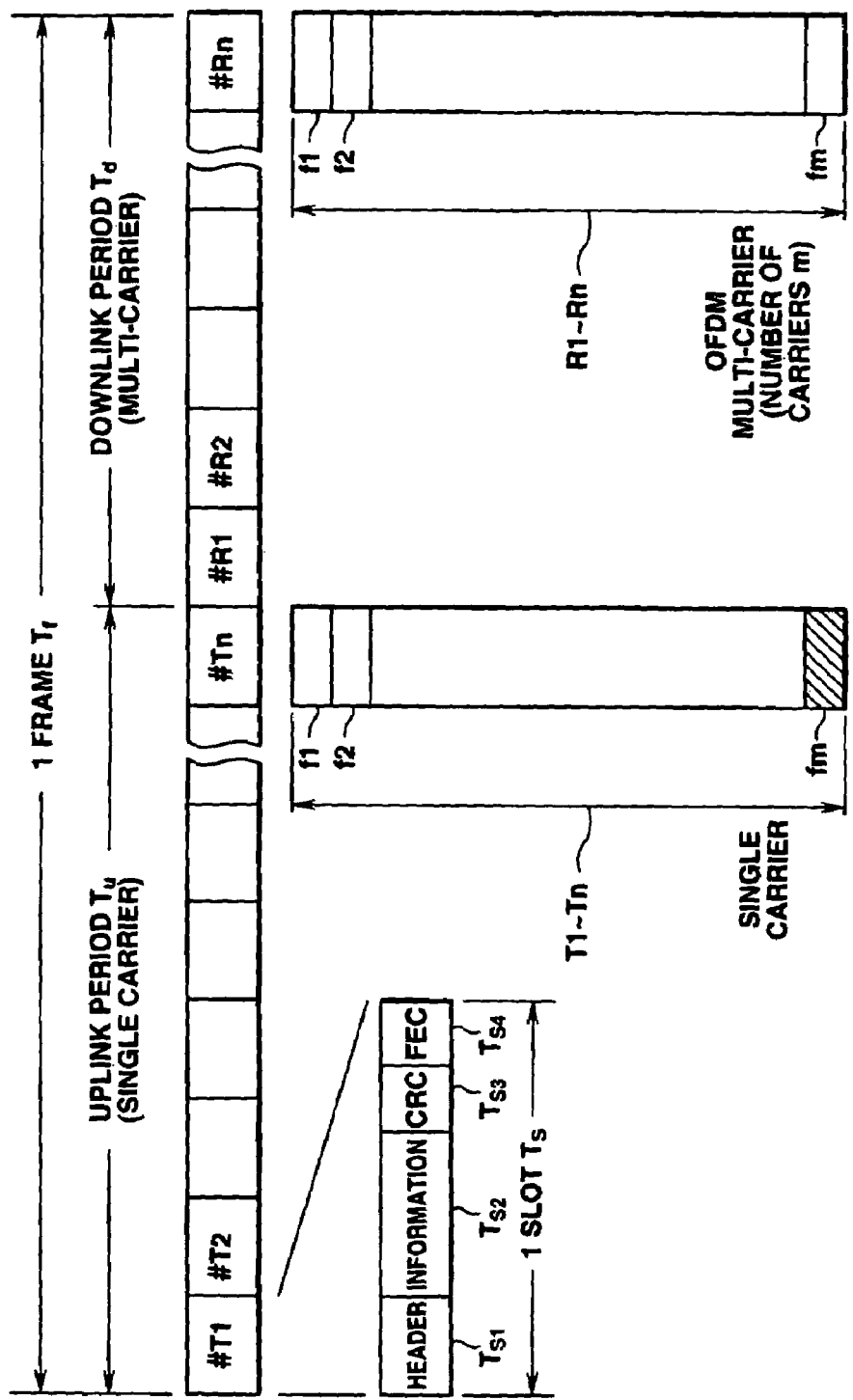
FIG. 7 is an explanatory view showing an exemplary frame structure in the case where access is made from the communication terminal device shown in FIG. 6.

Between the communication terminal device 200 and the base station device 15, a transmission signal having the frame structure as shown in FIG. 7 is radio-transmitted. Specifically, one frame is prescribed for each predetermined time period, and a plurality of time slots are formed in one frame. The frame cycle is synchronized with a synchronizing signal transmitted from the base station device 15, for example. In each time slot, a signal is transmitted in which a header part Ts1, an information part Ts2, a CRC (error detection code) part Ts3, and an FEC (error correction code) part Ts4 are sequentially arranged.

The maximum number of effective symbols that can be transmitted in the information part Ts2 of one slot is set at k.

In this case, the TDMA/TDD mode is applied as an access mode. The same frequency band is used both in an up link from the communication terminal device 200 to the base station device 15 and in a down link from the base station device 15 to the communication terminal device 200. In the up link and the down link, different time slots of one frame are time-divisionally used.

A predetermined number of slots T1, T2 . . . , Tn (where n is an arbitrary integer) in the former half of one frame are slots for an uplink period Tu and therefore are slots used for transmission of the up link from the terminal device 200 to the base station device 15. A predetermined number of slots R1, R2, . . . , Rn (where n is an arbitrary integer) in the latter half of one frame are slots for a downlink period Td and therefore are slots used for transmission of the down link from the base station device 15 to the terminal device 200.

For a signal which is radio-transmitted from the communication terminal device 200 to the base station device 15 in any one of the slots T1 to Tn prepared for the uplink period Tu, a band capable of transmitting a multi-carrier signal having m units of carriers is prepared as a transmission band. However, only one subcarrier (in this case, a subcarrier fm arranged at the end) is transmitted, and the data of the up link is transmitted as a single-carrier signal using only this subcarrier fm. In this case, the number of effective symbols transmitted in one slot is k/m.

A signal of the down link which is radio-transmitted from the base station device 15 to the communication terminal device 200 in any one of the slots R1 to Rn of the downlink period Td is a multi-carrier signal having m units of carriers and has data with the number of effective symbols equal to k.

Figure 8:
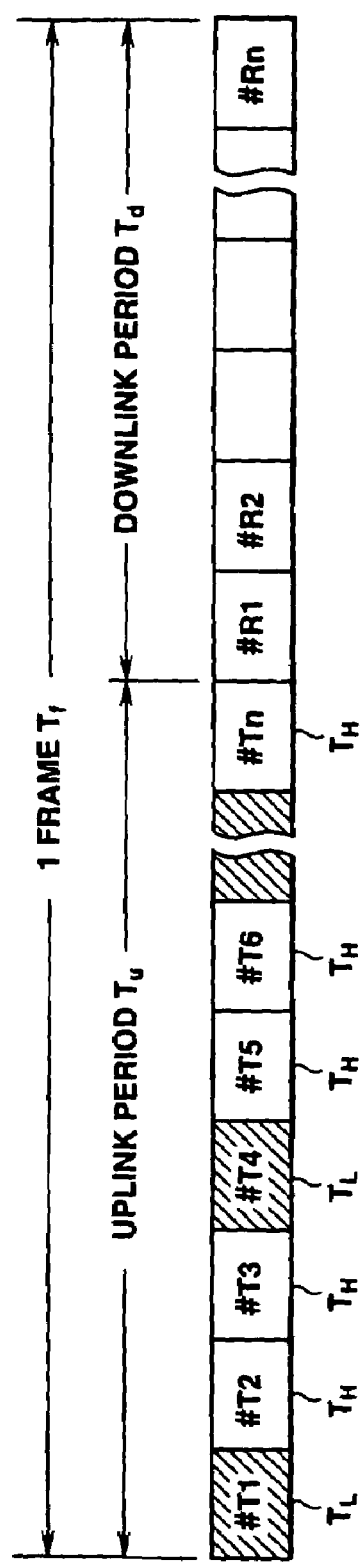
FIG. 8 is an explanatory view showing the frame structure in the case where a low-speed dedicated slot is prepared in the data communication system.

In the uplink period Tu, the slot position for transmitting data of the up link from the communication terminal device 16 to the base station device 15 may be set as shown in FIG. 8. Specifically, a predetermined number of slots (in this case, slots T1, T4, . . . at an interval of every three slots) of a plurality of slots T1, T2, . . . , Tn constituting the uplink period are set as low-speed slots $T_L$, and the remaining slots are set as high-speed slots $T_H$, as shown in FIG. 8. In transmitting a signal of the up link to the base station device 15 from the communication terminal device 200 which transmits a single-carrier signal by using only one subcarrier as the up link, the low-speed slots $T_L$ are used. On the other hand, in the case of the communication terminal device 100 which transmits a multi-carrier signal with the number of carriers equal to m as a signal of the up link, the high-speed slots $T_H$ are used.

In receiving a signal of the up link on the side of the base station device 15 under the control of the central processing unit 15e, at the slot position set as the high-speed slot $T_H$, m-point discrete Fourier transform processing is carried out by a fast Fourier transform circuit of the demodulation section 15k in the receiving system and a multi-carrier signal with the number of carriers equal to m is demodulated. At the slot position set as the low-speed slot $T_L$, a received signal of only one carrier is demodulated.

Figure 9:
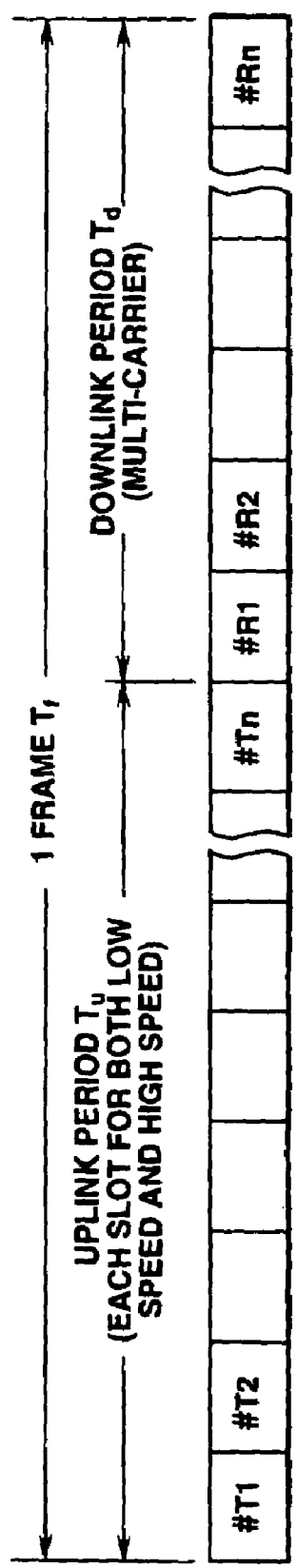
FIG. 9 is an explanatory view showing the frame structure in the case where a low-speed/high-speed slot is prepared in the data communication system.

As another structure for transmitting data of the up link from the communication terminal device 200 to the base station device 15 in the uplink period Tu, both transmission of a single-carrier signal from the communication terminal device 200 and transmission of a multi-carrier signal from the communication terminal device 100 may be made possible in any slot of the plural slots T1, T2, . . . , Tn constituting the uplink period, as shown in FIG. 9.

In the case where transmission of both a single carrier-signal and a multi-carrier signal is made possible at each slot, the state of the received signal is discriminated on the side of the base station device 15.

Figure 10:
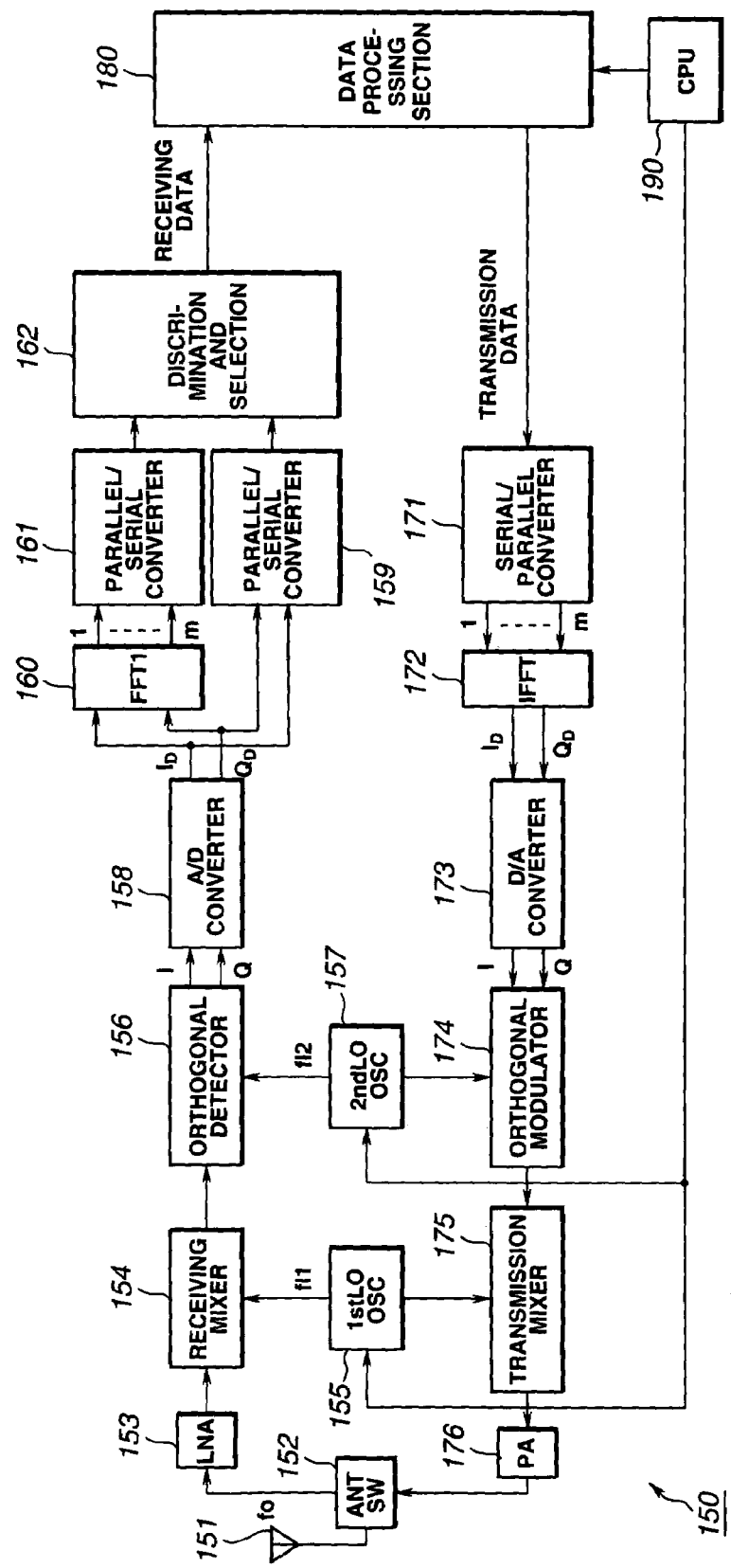
FIG. 10 is a block diagram showing the structure of essential portions of a base station device used as the MMAC base station device.

FIG. 10 is a block diagram showing a specific example of the structure of a receiving processing system and a transmission processing system of a base station device 150 used as the MMAC base station device 15 in this case. In this base station device 150, the receiving processing system corresponds to the receiving section 15*j* and the demodulation section 15*k* of the MMAC base station device 15. The receiving processing system includes a low-noise amplifier 153 connected to a transmission/receiving antenna 151 through an antenna switch 152, an orthogonal detector 156 connected to the low-noise amplifier 153 through a receiving mixer 154, a parallel-serial converter 159 and a fast Fourier transform (FFT) circuit 160 connected to the orthogonal detector 156 through an A/D converter 158, a parallel/serial converter 161 connected to the FFT circuit 160, and a discrimination and selection circuit 162 connected to the parallel/serial converters 159 and 161.

The transmission processing system corresponds to the modulation section 15*g* and the transmission section 15*h* of the MMAC base station device 15. The transmission processing system includes a serial/parallel converter 171 to which transmission data is supplied, an inverse fast Fourier transform (IFFT) circuit 172 connected to the serial/parallel converter 171, an orthogonal modulator 174 connected to the IFFT circuit 172 through a D/A converter 173, and a power amplifier 176 connected to the orthogonal modulator 174 through a transmission mixer 175. The power amplifier 176 is connected to the transmission/receiving antenna 151 through the antenna switch 152.

To the receiving mixer 154 and the transmission mixer 175, an oscillation output f11 of a first local oscillator 155 is supplied. To the orthogonal detector 156 and the orthogonal modulator 174, an oscillation output f12 of a second local oscillator 157 is supplied. The oscillation frequencies of the first local oscillator 155 and the second local oscillator 157 are controlled by a control section 190, which corresponds to the central processing unit 15*e* of the MMAC base station device 15.

In the receiving processing system of the base station device 150 of such a structure, a received signal is inputted to the low-noise amplifier 153 from the transmission/receiving antenna 151 through the antenna switch 152. The low-noise amplifier 153 amplifies the received signal and supplies the signal to the receiving mixer 154. The receiving mixer 154 mixes the oscillation output f11 of the first local oscillator 155 with the received signal and converts the received signal of a predetermined frequency band f0 to an intermediate-frequency signal.

The intermediate-frequency signal obtained by the receiving mixer 154 is supplied to the orthogonal detector 156. The orthogonal detector 156 mixes the oscillation output f12 of the second local oscillator 157 with the intermediate-frequency signal and performs orthogonal wave detection on the intermediate-frequency signal, thus splitting the signal into an I-component and a Q-component. The I-component and Q-component detected by the orthogonal detector 156 are converted to digital data $I_D$, $Q_D$ of the respective components by the A/D converter 158. The parallel/serial converter 159 converts the digital data $I_D$, $Q_D$ supplied from the A/D converter 158 to one sequence of serial data and supplies this serial data to the discrimination and selection circuit 162. The fast Fourier transform circuit 160 performs discrete Fourier transform with m points equal to the number of subcarriers with respect to the digital data $I_D$, $Q_D$ supplied from the A/D converter 158 and thus generates parallel data of m symbols. The parallel/serial converter 161 converts the parallel data of m symbols generated by the fast Fourier transform circuit 160 to one sequence of serial data and supplies this serial data to the discrimination and selection circuit 162.

Figure 11:
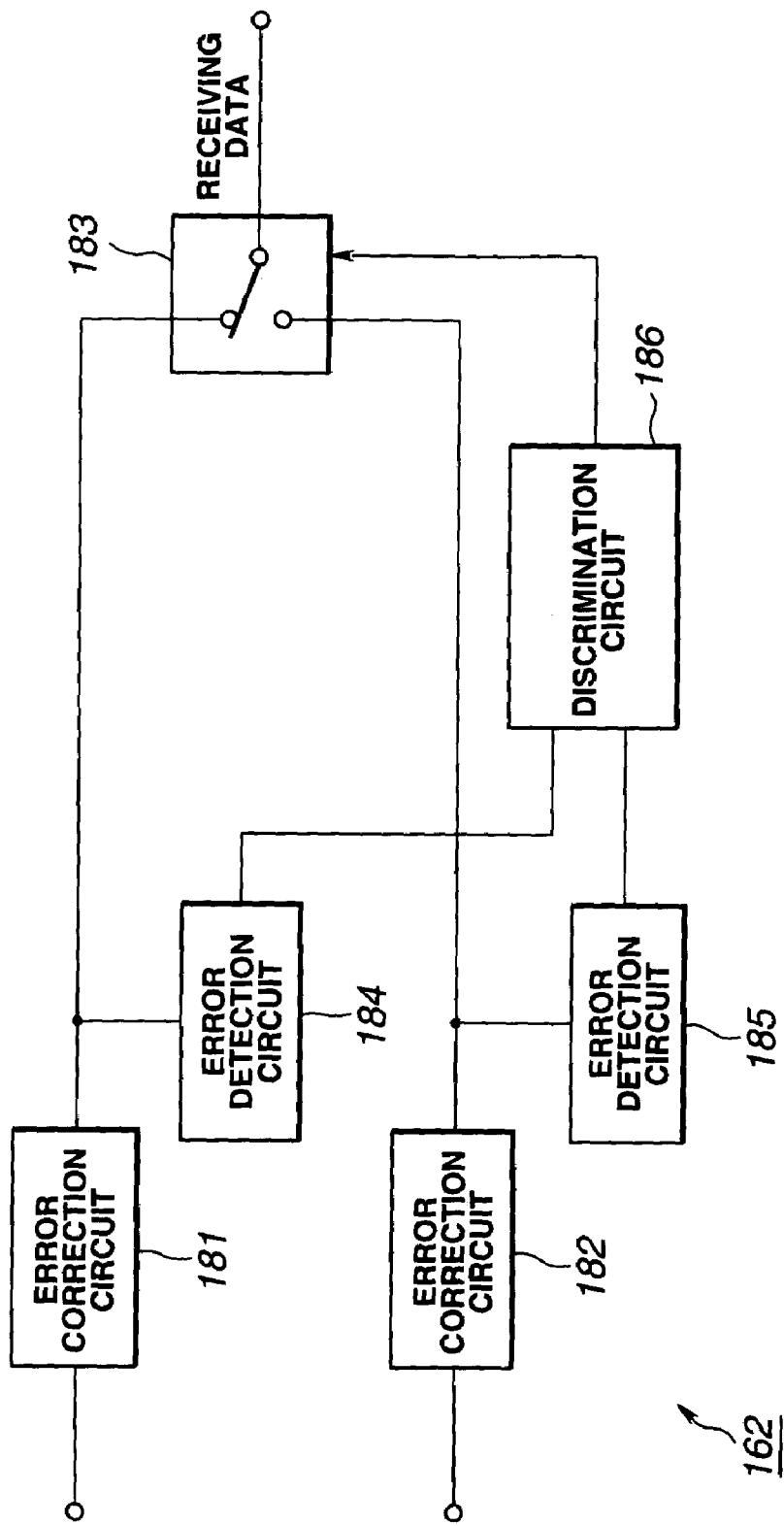
FIG. 11 is a block diagram showing a specific example of the structure of a discrimination and selection circuit in the base station device shown in FIG. 10.

The discrimination and selection circuit 162 includes an error correction circuit 181 to which serial data is supplied from the parallel/serial converter 159, an error correction circuit 182 to which serial data is supplied from the parallel/serial converter 161, a data selection circuit 183 to which two sequences of serial data with errors corrected by the error correction circuits 181, 182 are supplied, error detection circuits 184, 185 for carrying out error detection of the two sequences of serial data with errors corrected by the error correction circuits 181, 182, and a discrimination circuit 186 to which error detection outputs of the error detection circuits 184, 185 are supplied, as shown in FIG. 11.

The error correction circuits 181, 182 carry out error correction based on an error correction code (FEC or forward error correction) appended to each slot with respect to the two sequences of serial data supplied from the parallel/serial converters 159, 161, and supply two sequences of error-corrected serial data to the data selection circuit 183. The error detection circuits 184, 185 carry out error detection based on an error detection code (CRC or cyclic redundancy code) appended to each slot with respect to the two sequences of serial data with errors corrected by the error correction circuits 181, 182, and supply error detection outputs indicating errors included in the two sequences of error-corrected serial data to the discrimination circuit 186. The discrimination circuit 186 compares the error detection outputs from the error detection circuit 184, 185 so as to discriminate which sequence of serial data is the data considered to be the correct received data, and controls the selection circuit 183 on the basis of the result of discrimination.

The discrimination and selection circuit 162 supplies the sequence of serial data selected by the data selection circuit 183 as received data to a data processing section 180, which corresponds to the MMAC channel coding/decoding section 15*d* of the base station device 15.

On the other hand, in the transmission processing system in the base station device 150, transmission data (serial data) supplied from the data processing section 180 is converted to m units of parallel data by the serial/parallel converter 171. The inverse fast Fourier transform circuit 172 performs inverse discrete Fourier transformations with m points with respect to the m units of parallel data and thus generates digital baseband data $I_D$, $Q_D$ on the orthogonal time bases. The baseband data $I_D$, $Q_D$ are converted to the analog format by the D/A converter 173, thus obtaining analog signals of the I-component and Q-component.

The orthogonal modulator 174, to which the I-component and Q-component signals are supplied from the D/A converter 173, performs orthogonal modulation of the I-component and Q-component signals by using the oscillation output f12 of the second local oscillator 157 as a carrier wave. The signal orthogonally modulated by the orthogonal modulator 174 is mixed with the oscillation output f11 of the local oscillator 155 by the transmission mixer 175, thus frequency-converting the signal to a signal of a transmission frequency band. The frequency-converted signal is amplified by the power amplifier 176 and is then radio-transmitted to the terminal device 16 from the antenna 151 through the antenna switch 152.

Figure 12:
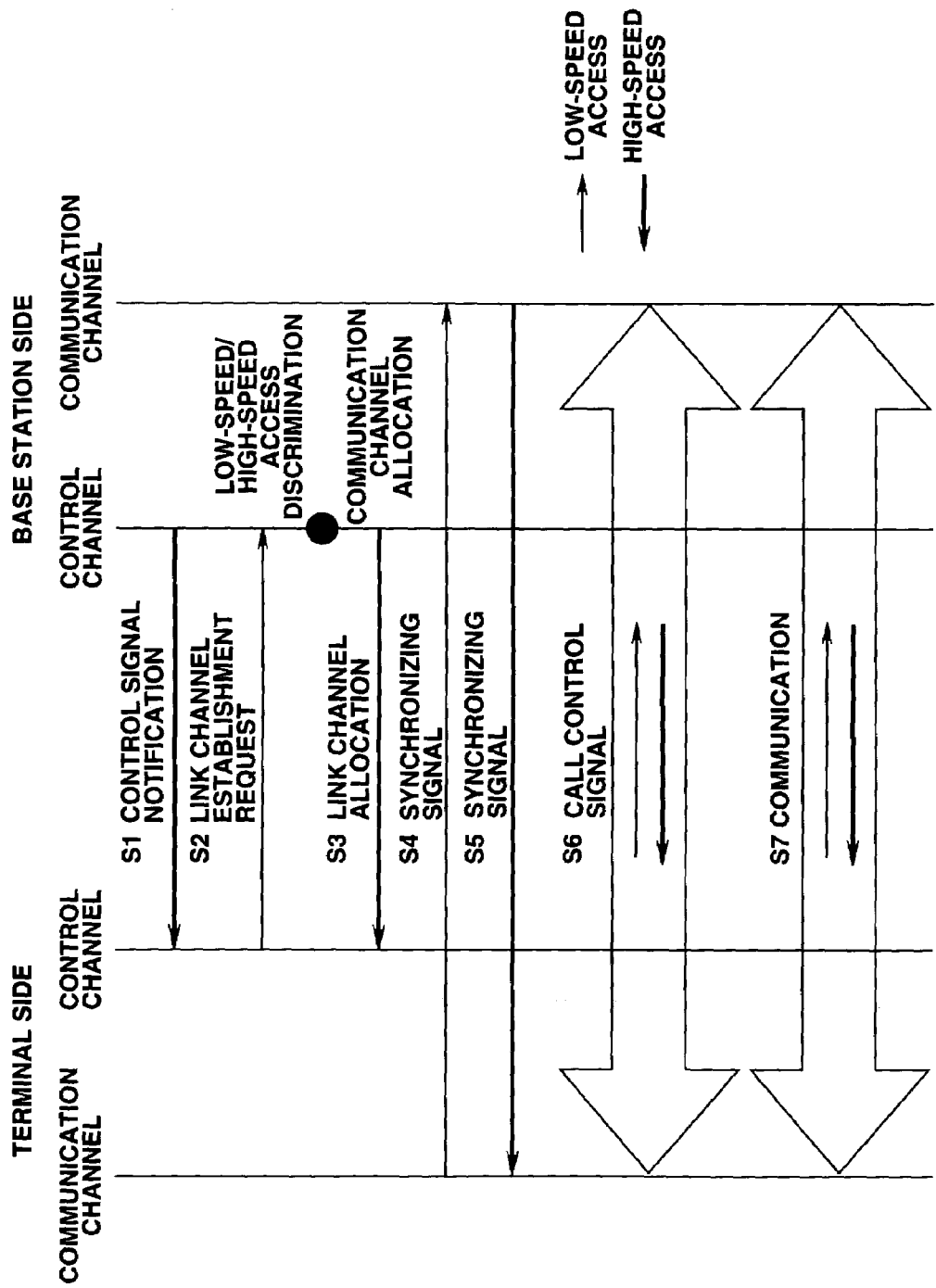
FIG. 12 is an explanatory view showing an exemplary control sequence in the data communication system.

An exemplary control sequence in carrying out communication between the base station device 15 and the terminal device 16 in the data communication system thus constituted will now be described with reference to FIG. 12. In FIG. 12, the left side is the side of the terminal device 16 and the right side is the side of the base station device 15. Both the terminal device side and the base station device side can access their respective control channels and communication channels. In FIG. 12, transmission of signals indicated by a bold arrow is transmission using a high-speed access circuit (slot) with the number of carriers m, and transmission of signals indicated by a lean arrow is transmission using a low-speed access circuit (slot) with a single carrier.

From the base station device 15, a control signal S1 for each terminal device 16 to wait is intermittently sent in a control channel slot of the down link. On the side of the terminal device 16, the control signal S1 is intermittently received. By such intermittent reception at the time of waiting, in the case where the communication terminal device is driven by a battery provided therein, the duration of the battery can be elongated.

On the side of the terminal device 16, in requesting transmission of a signal, a link channel establishment request signal S2 is transmitted in a control channel slot of the up link. If the terminal device 16 which requested transmission of a signal is the terminal device 200 for transmitting a single-carrier signal in the up link as shown in FIG. 6, the link channel establishment request signal S2 is transmitted by using a low-speed access circuit (slot) with a single carrier. On the side of the base station device 15, when the link channel establishment request signal S2 is received, it is discriminated whether the signal is a low-speed access signal (that is, transmission of a single-carrier signal) or a high-speed access signal (that is, transmission of a multi-carrier signal with m carriers). For example, in the case where the slots of the uplink period are divided into low-speed access slots and high-speed access slots as shown in FIG. 8, whether it is low-speed access or high-speed access can be discriminated from the slot position where the signal is received. On the other hand, if each slot is usable both for low-speed access and for high-speed access as shown in FIG. 9, whether it is low-speed access or high-speed access is discriminated on the basis of the result of error detection with respect to a demodulation output conformable to each mode, as in the base station device 150 shown in FIG. 10.

After this access discrimination, a link channel allocation signal S3 is transmitted to notify of an unoccupied communication channel. In response to this notification, on the side of the terminal device 16, communication is shifted to a designated communication channel (slot) and a synchronizing signal S4 is transmitted in that communication channel. At this point, since it is known on the side of the base station device 15 that the signal from the communication terminal device 16 is a low-speed access signal or a high-speed access signal (in this example, a low-speed access signal), the signal can be demodulated. A synchronizing signal S5 is transmitted from the side of the base station device, too, and synchronization between both sides is established.

After that, a call control signal S6 for setting and acceptance of the connection destination is transmitted and received between both sides. Then, the communication shifts to the communication state for transmitting main data S7 in a data service such as Internet access, dynamic image server access, video-on-demand, or Internet broadcast. Also, in this communication state, low-speed access is carried out in the up link and high-speed access is carried out only in the down link. In the example of FIG. 12, low-speed access is carried out in the up link from the terminal device 16. However, if high-speed access is carried out in the up link from the terminal device 16, a low-speed access signal is simply changed to a high-speed access signal in the control sequence.

Since the terminal device 16 employs the structure for carrying out low-speed access in the up link, the burden on the hardware of the transmission processing system in the terminal device 16 can be reduced and efficient transmission can be realized. Specifically, in the communication terminal device 100 for carrying out transmission processing of a multi-carrier signal, the power amplifier 116 of the transmission section needs to have broad linearity. However, in the power amplifier 216 of the transmission section of the communication terminal device 200 shown in FIG. 1, it suffices to carry out amplification processing of a single-carrier signal, and an amplifier requiring no broad linearity and thus having high power efficiency can be used. Therefore, the structure of the terminal device 16 can be simplified. Thus, if the terminal device 16 is driven by a battery, the power required for transmission processing can be reduced and reduction in dissipation power (that is, elongation of duration of the battery) can be realized.

In this case, the signal at the time of low-speed access in the up link has such a format that a part of a plurality of subcarriers constituting a multi-carrier signal is thinned out. Therefore, on the side of the base station device 15, the processing is not very different from the processing at the time of receiving a transmission signal of high-speed access (that is, only fast Fourier transform is changed or the like). Thus, an asymmetrical radio data communication system having less information quantity in the up link and carrying out high-speed access in the down link can be efficiently realized.

In the case where low-speed access is carried out in the up link as in this example, the quantity of data that can be transmitted from the terminal device 16 to the base station device 15 is reduced accordingly. In the case of the MMAC communication system or the like to which this example is applied, transmission in the down link is transmission of data of Internet access, dynamic image server access, video-on-demand or Internet broadcast and therefore requires a large transmission capacity. However, transmission in the up link is transmission of data indicating execution of these accesses and data having a relatively small data quantity such as electronic mail data. Therefore, there is little inconvenience in the low-speed access in the up link.

Figure 13:
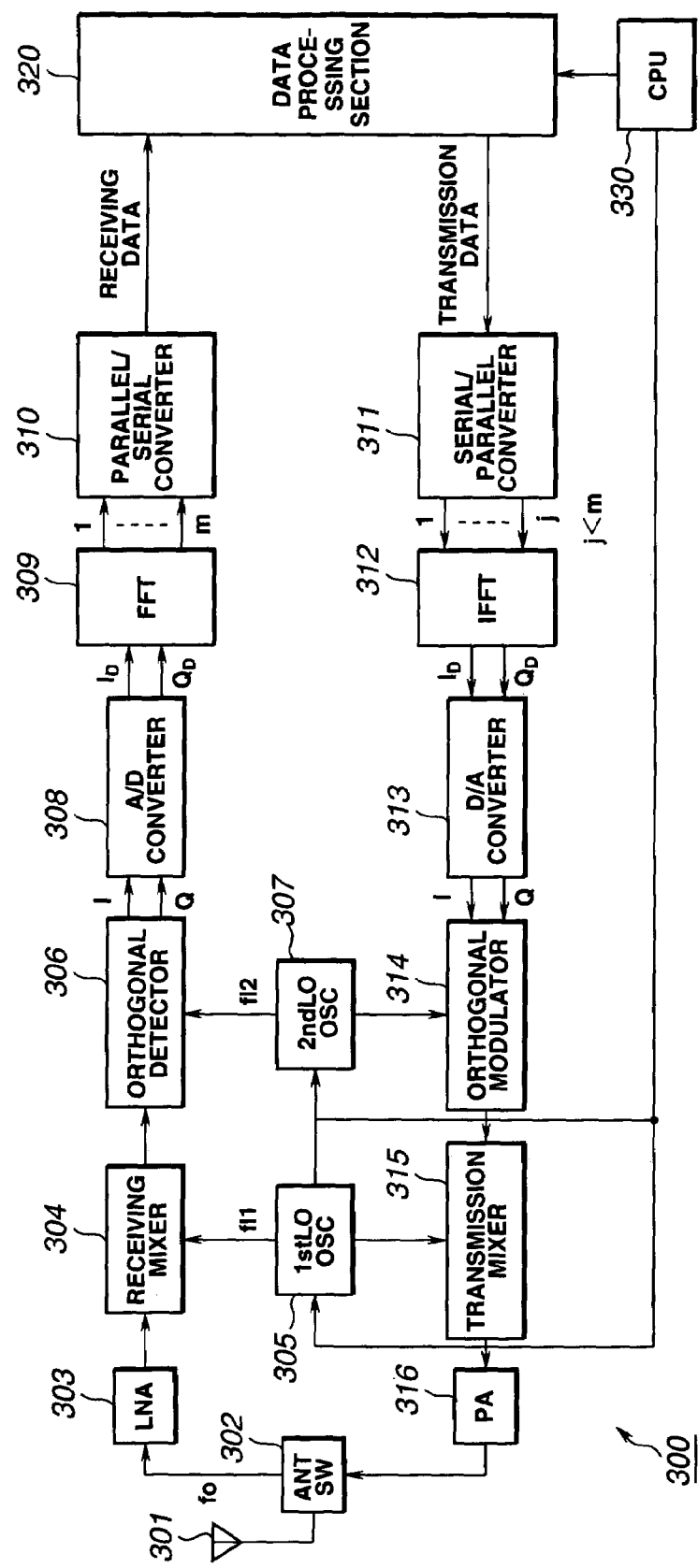
FIG. 13 is a block diagram showing the structure of essential portions of another communication terminal device used as the MMAC terminal device.

Also, in this data communication system, a terminal device 300 having the structure as shown in FIG. 13 may be used as the terminal device 16. In the communication terminal device 300 shown in FIG. 13, the receiving processing system corresponds to the receiving section 16b and the demodulation section 16c of the portable information terminal device 16. The receiving processing system includes a low-noise amplifier 303 connected to a transmission/receiving antenna 301 through an antenna switch 302, an orthogonal detector 306 connected to the low-noise amplifier 303 through a receiving mixer 304, a fast Fourier transform (FFT) circuit 309 connected to the orthogonal detector 306 through an A/D converter 308, and a parallel/serial converter 310 connected to the FFT circuit 309.

The transmission processing system corresponds to the modulation section 16e and the transmission section 16f of the portable information terminal device 16. The transmission processing system includes a serial/parallel converter 311 to which transmission data is supplied, an inverse fast Fourier transform (IFFT) circuit 312 connected to the serial/parallel converter 311, an orthogonal modulator 314 connected to the IFFT circuit 312 through a D/A converter 313, and a power amplifier 316 connected to the orthogonal modulator 314 through a transmission mixer 315. The power amplifier 316 is connected to the transmission/receiving antenna 301 through the antenna switch 302.

To the receiving mixer 304 and the transmission mixer 315, an oscillation output f11 of a first local oscillator 305 is supplied. To the orthogonal detector 306 and the orthogonal modulator 314, an oscillation output f12 of a second local oscillator 307 is supplied. The oscillation frequencies of the first local oscillator 305 and the second local oscillator 307 are controlled by a control section 330, which corresponds to the central processing unit 16g of the portable information terminal device 16.

In the receiving processing system in the communication terminal device 300 of such a structure, a received signal is inputted to the low-noise amplifier 303 from the transmission/receiving antenna 301 through the antenna switch 302. The low-noise amplifier 303 amplifies the received signal and supplies the signal to the receiving mixer 304. The receiving mixer 304 mixes the oscillation output f11 of the first local oscillator 305 with the received signal and converts the received signal of a predetermined frequency band to an intermediate-frequency signal.

The intermediate-frequency signal obtained by the receiving mixer 304 is supplied to the orthogonal detector 306. The orthogonal detector 306 mixes the oscillation output f12 of the second local oscillator 307 with the intermediate-frequency signal and performs orthogonal wave detection on the intermediate-frequency signal, thus splitting the signal into an I-component and a Q-component. The I-component and Q-component detected by the orthogonal detector 306 are converted to digital data $I_D$, $Q_D$ of the respective components by the A/D converter 308. The fast Fourier transformation circuit 309 performs discrete Fourier transform with m points equal to the number of subcarriers by parallel processing with respect to the digital data $I_D$, $Q_D$ supplied from the orthogonal detector 306 through the A/D converter 308, and thus generates parallel data of m symbols.

The parallel data of m symbols generated by the fast Fourier transform circuit 309 is converted to one sequence of serial data by the parallel/serial converter 310, and this serial data is supplied as received data to a data processing section 320, which corresponds to the MMAC channel coding/decoding section 16d and the like of the portable information terminal device 16. Then, various kinds of data processing such as video display and audio reproduction are carried out.

On the other hand, in the transmission processing system in the communication terminal device 300, transmission data (serial data) supplied from the data processing section 320 is converted to j units of parallel data by the serial/parallel converter 311. (The value of j is a value corresponding to the number of carriers j of a multi-carrier signal to be transmitted, and is an integer value smaller than the number of carriers m of the multi-carrier signal of the down link.) The inverse fast Fourier transform circuit 312 performs inverse discrete Fourier transformation with j points by parallel processing with respect to the j units of parallel data, and thus obtains digital baseband data $I_D$, $Q_D$ on the orthogonal time bases. The baseband data $I_D$, $Q_D$ are converted to the analog format by the D/A converter 313, thus obtaining analog signals of the I-component and Q-component.

The orthogonal modulator 314, to which the I-component and Q-component signals are supplied from the D/A converter 313, performs orthogonal modulation of the I-component and Q-component signals by using the oscillation output f12 of the second local oscillator 307 as a carrier wave. The signal orthogonally modulated by the orthogonal modulator 314 is mixed with the oscillation output fit of the local oscillator 305 by the transmission mixer 315, thus frequency-converting the signal to a signal of a transmission frequency band. The frequency-converted signal is amplified by the power amplifier 316 and is then radio-transmitted from the antenna 301 through the antenna switch 302.

The communication terminal device 300 differs from the terminal communication device 100 shown in FIG. 4 in that transmission data (serial data) in the transmission processing system is converted to j units of parallel data by the serial/parallel converter 311 and is then processed with inverse discrete Fourier transformation by the inverse Fourier transform circuit 312, thus obtaining digital baseband data $I_D$, $Q_D$ on the orthogonal time bases.

By carrying out such transmission processing, the signal of the up link transmitted from the communication terminal device 300 to the base station device 15 is changed to a multi-carrier signal with the number of subcarriers equal to j. The value of j is smaller than the number of subcarriers m in the down link, as described above. To facilitate FFT processing and the like, it is preferred that the value of j is the power of 2. For example, if m is 32, j is set to be 4. In the following description, j=4 is employed.

Figure 14:
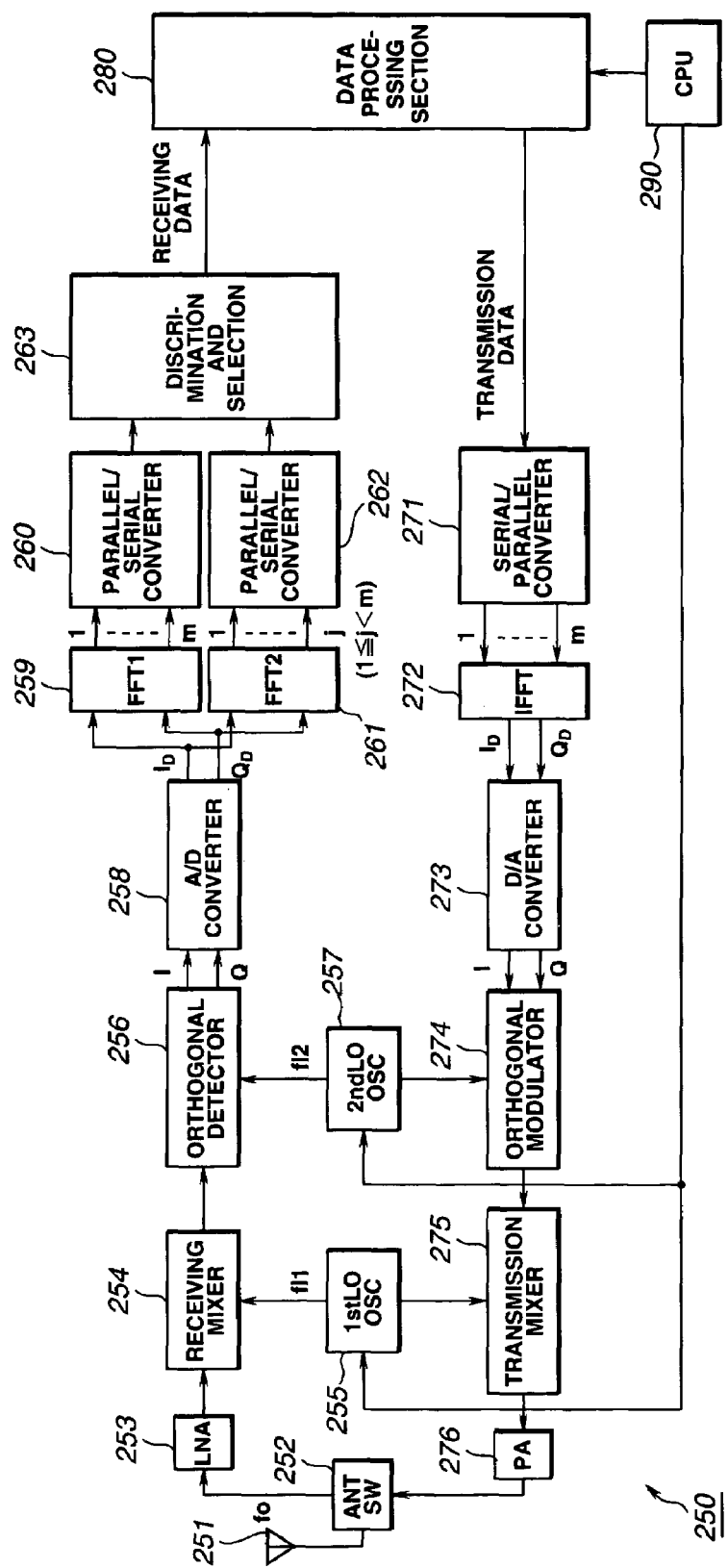
FIG. 14 is a block diagram showing the structure of essential portions of another base station device used as the MMAC base station device.

As the MMAC base station device 15 corresponding to the communication terminal device 300 having the above-described structure, a base station device 250 having the structure as shown in FIG. 14 is used. In this base station device 250 shown in FIG. 14, the receiving processing system corresponds to the receiving section 15j and the demodulation section 15k of the MMAC base station device 15. The receiving processing system includes a low-noise amplifier 253 connected to a transmission/receiving antenna 251 through an antenna switch 252, an orthogonal detector 256 connected to the low-noise amplifier 253 through a receiving mixer 254, fast Fourier transform (FFT) circuits 259, 261 connected to the orthogonal detector 256 through an A/D converter 258, and a discrimination and selection circuit 263 connected to the FFT circuits 259, 261 through parallel/serial converters 260, 262, respectively.

The transmission processing system corresponds to the modulation section 15g and the transmission section 15h of the MMAC base station device 15. The transmission processing system includes a serial/parallel converter 271 to which transmission data is supplied, an inverse fast Fourier transform (IFFT) circuit 272 connected to the serial/parallel converter 271, an orthogonal modulator 274 connected to the IFFT circuit 272 through a D/A converter 273, and a power amplifier 276 connected to the orthogonal modulator 274 through a transmission mixer 275. The power amplifier 276 is connected to the transmission/receiving antenna 251 through the antenna switch 252.

To the receiving mixer 254 and the transmission mixer 275, an oscillation output f11 of a first local oscillator 255 is supplied. To the orthogonal detector 256 and the orthogonal modulator 274, an oscillation output f12 of a second local oscillator 257 is supplied. The oscillation frequencies of the first local oscillator 255 and the second local oscillator 257 are controlled by a control section 290, which corresponds to the central processing unit 15e of the MMAC base station device 15.

In the receiving processing system of the base station device 250 of such a structure, a received signal is inputted to the low-noise amplifier 253 from the transmission/receiving antenna 251 through the antenna switch 252. The low-noise amplifier 253 amplifies the received signal and supplies the signal to the receiving mixer 254. The receiving mixer 254 mixes the oscillation output f11 of the first local oscillator 255 with the received signal and converts the received signal of a predetermined frequency band f0 to an intermediate-frequency signal.

The intermediate-frequency signal obtained by the receiving mixer 254 is supplied to the orthogonal detector 256. The orthogonal detector 256 mixes the oscillation output f12 of the second local oscillator 257 with the intermediate-frequency signal and performs orthogonal wave detection on the intermediate-frequency signal, thus splitting the signal into an I-component and a Q-component. The I-component and Q-component detected by the orthogonal detector 256 are converted to digital data $I_D$, $Q_D$ of the respective components by the A/D converter 258. The first fast Fourier transform circuit 259 performs discrete Fourier transformation with m points equal to the maximum number of subcarriers with respect to the digital data $I_D$, $Q_D$ supplied from the A/D converter 258 and thus generates parallel data of m symbols. The parallel/serial converter 260 converts the parallel data of m symbols supplied from the first fast Fourier transform circuit 259 to one sequence of serial data and supplies this serial data to the discrimination and selection circuit 263. The second fast Fourier transform circuit 261 performs discrete Fourier transformation with j points (in this case, four points) with respect to the digital data $I_D$, $Q_D$ supplied from the A/D converter 258 and thus generates parallel data of j symbols (four symbols). The parallel/serial converter 262 converts the parallel data of j symbols supplied from the second fast Fourier transform circuit 261 to one sequence of serial data and supplies this serial data to the discrimination and selection circuit 263.

In the discrimination and selection circuit 263, it is discriminated which sequence of serial data of the two sequences of serial data supplied from the parallel/serial converters 260, 262 is the data considered to be correct received data, and the discriminated sequence of serial data is selected as received data and supplied to a data processing section 280, which corresponds to the MMAC channel coding/decoding section 15d of the base station device 15.

On the other hand, in the transmission processing system in the base station device 250, transmission data (serial data) supplied from the data processing section 280 is converted to m units of parallel data by the serial/parallel converter 271. The inverse fast Fourier transform circuit 272 performs inverse discrete Fourier transformation with m points with respect to the m units of parallel data and thus generates digital baseband data $I_D$, $Q_D$ on the orthogonal time bases. The baseband data $I_D$, $Q_D$ are converted to the analog format by the D/A converter 273, thus obtaining analog signals of the I-component and Q-component.

The orthogonal modulator 274, to which the I-component and Q-component signals are supplied from the D/A converter 273, performs orthogonal modulation of the I-component and Q-component signals by using the oscillation output f12 of the second local oscillator 257 as a carrier wave. The signal orthogonally modulated by the orthogonal modulator 274 is mixed with the oscillation output f11 of the local oscillator 255 by the transmission mixer 275, thus frequency-converting the signal to a signal of a transmission frequency band. The frequency-converted signal is amplified by the power amplifier 276 and is then radio-transmitted to the terminal device 16 from the antenna 251 through the antenna switch 252.

The base station device 250 differs from the base station device 150 shown in FIG. 10 in that the parallel data of m symbols generated by the first fast Fourier transform circuit 259 from the digital data $I_D$, $Q_D$ supplied from the A/D converter 258 is converted to one sequence of serial data by the parallel/serial converter 260 while the parallel data of j symbols generated by the second fast Fourier transform circuit 261 is converted to one sequence of serial data by the parallel/serial converter 262.

Figure 15:
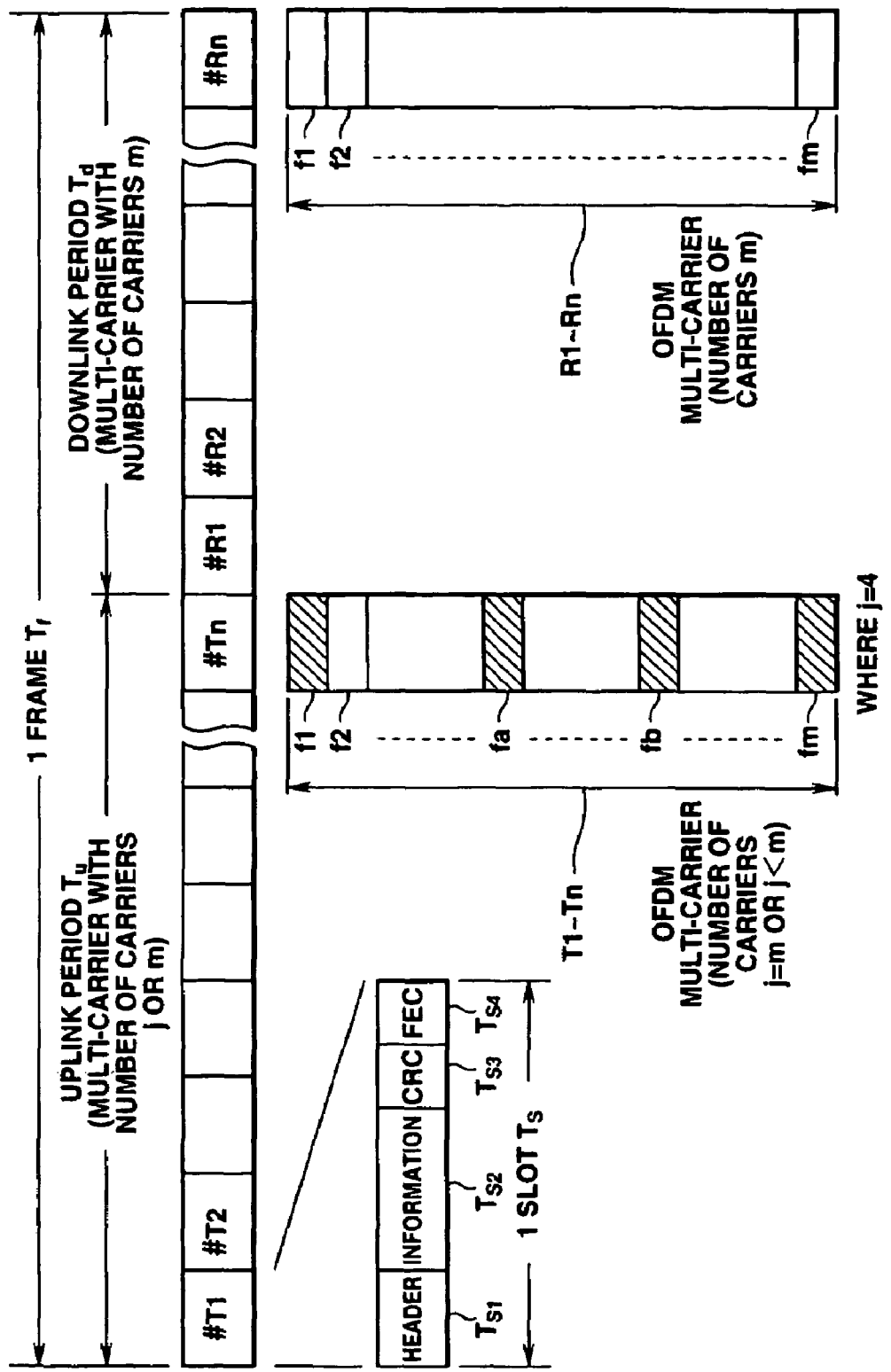
FIG. 15 is an explanatory view showing an exemplary frame structure in the case where access is made from the communication terminal device shown in FIG. 13.

Between the communication terminal device 300 having the structure as shown in FIG. 13 and the base station device 250 having the structure as shown in FIG. 14, a transmission signal having the frame structure as shown in FIG. 15 is radio-transmitted. Specifically, one frame is prescribed for each predetermined time period, and a plurality of time slots are formed in one frame. The frame cycle is synchronized with a synchronizing signal transmitted from the base station device 250, for example. In each time slot, a signal is transmitted in which a header part Ts1, an information part Ts2, a CRC (error detection code) part Ts3, and an FEC (error correction code) part Ts4 are sequentially arranged.

The maximum number of effective symbols that can be transmitted in the information part Ts2 of one slot is set at k.

In this case, the TDMA/TDD mode is applied as an access mode. The same frequency band is used both in an up link from the communication terminal device 300 to the base station device 250 and in a down link from the base station device 250 to the communication terminal device 300. In the up link and the down link, different time slots of one frame are time-divisionally used. A predetermined number of slots T1, T2, ..., Tn (where n is an arbitrary integer) in the former half of one frame are slots for an uplink period Tu and therefore are slots used for transmission of the up link from the terminal device 300 to the base station device 250. A predetermined number of slots R1, R2, ..., Rn (where n is an arbitrary integer) in the latter half of one frame are slots for a downlink period Td and therefore are slots used for transmission of the down link from the base station device 250 to the terminal device 300.

For a signal which is radio-transmitted from the communication terminal device 300 to the base station device 250 in any one of the slots T1 to Tn prepared for the uplink period Tu, a band capable of transmitting a multi-carrier signal having m units of carriers is prepared as a transmission band. However, only j units (in this case, four units) of subcarriers f1, fa, fb, fm at a substantially equal interval are transmitted, and the data of the up link is transmitted as a multi-carrier signal using only these j (four) subcarriers. In this case, the number of effective symbols transmitted in one slot is k×j/m. However, in some cases, a multi-carrier signal made up of m subcarrier signals from the terminal device 16 having the structure different from that of FIG. 13, for example, the communication terminal device 100 shown in FIG. 4, and a single-carrier signal from the communication terminal device 200 shown in FIG. 6 may be transmitted in the up link.

A signal of the down link which is radio-transmitted from the base station device 250 to the communication terminal device in any one of the slots R1 to Rn of the downlink period Td is a multi-carrier signal having m units of carriers and has data with the number of effective symbols equal to k.

In the uplink period Tu, the slot position for transmitting data of the up link from the communication terminal device of this example to the base station device may be any slot position, since in the case of the base station device 250 having the structure as shown in FIG. 14, demodulation of the multi-carrier signal with m subcarriers and demodulation of the multi-carrier signal with j subcarriers are simultaneously carried out so that the correctly demodulated signal is selected. (In actual communication, transmission is carried out at the slot position designated from the base station device 250.)

In the case where the position of the low-speed slot and the position of the high-speed slot are predetermined as shown in FIG. 8, the number of subcarriers can be determined from the slot position received in the base station device 15. In the structure of the base station device 15, the plural fast Fourier transform circuits 259, 261 as in the base station device 250 shown in FIG. 14 need not be provided, and the number of transformation points in carrying out discrete Fourier transform processing by one fast Fourier transform circuit may be changed between m points and j points in accordance with the receiving slot position.

As is described above, in the communication terminal device 16 employing the structure for carrying out low-speed access in the up link, the burden on the hardware of the transmission processing system can be reduced and efficient transmission can be realized. Specifically, in the communication terminal device 300 shown in FIG. 13, a multi-carrier signal is transmitted both in the down link and in the up link, but the number of subcarriers of the multi-carrier signal in the up link is reduced. Therefore, it suffices that the power amplifier 316 of the transmission section processes a signal of a narrower band, and an amplifier requiring no broad linearity and hence having high power efficiency can be used, thus enabling simplification of the structure. Thus, the power required for transmission processing can be reduced, and if the communication terminal device 16 is driven by a battery, reduction in dissipation power (that is, elongation of duration of the battery) can be realized.

Particularly, in the communication terminal device 300, the number of subcarriers of the up link is made significantly smaller than the number of subcarriers of the down link (for example, m=32 and j=4), and the signal having less subcarriers is dispersed substantially uniformly within the band for transmission. By doing so, the burden on the power amplifier 316 in the transmission system can be significantly reduced, and the data is dispersedly transmitted within the band in comparison with the case where a single-carrier signal is transmitted as in the communication terminal 200 of FIG. 6. Therefore, even when there is an error in transmission of a signal having a subcarrier of a specified frequency, the error can be corrected by using an error correction code or the like, and the advantage proper to the multi-carrier signal can be utilized.

In the foregoing example, the value of j is significantly smaller than the value of m. However, if the value of j is at least smaller than the value of m, the above-described effect of efficiency improvement of the power amplifier can be realized.

Figure 16:
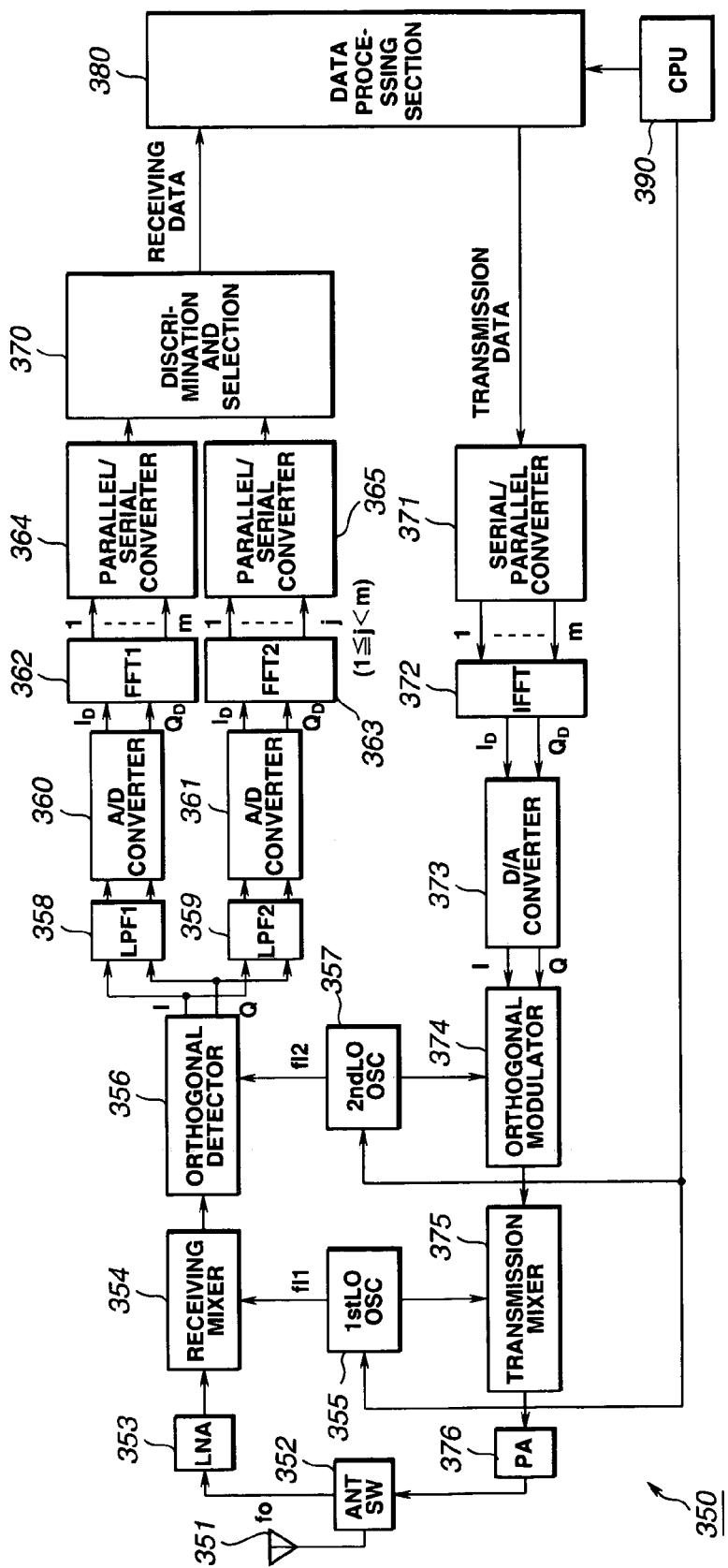
FIG. 16 is a block diagram showing the structure of essential portions of another base station device used as the MMAC base station device.

Moreover, in the data communication system of this embodiment, a base station device 350 having the structure as shown in FIG. 16 may be used as the MMAC base station device 15.

In this base station device 350 shown in FIG. 16, the receiving processing system corresponds to the receiving section 15*j* and the demodulation section 15*k* of the MMAC base station device 15. The receiving processing system includes a low-noise amplifier 353 connected to a transmission/receiving antenna 351 through an antenna switch 352, an orthogonal detector 356 connected to the low-noise amplifier 353 through a receiving mixer 354, A/D converters 360, 361 connected to the orthogonal detector 356 through low-pass filters 358, 359, fast Fourier transform (FFT) circuits 362, 363 connected to the A/D converters 360, 361, and a discrimination and selection circuit 370 connected to the FFT circuits 362, 363 through parallel/serial converters 364, 365, respectively.

The transmission processing system corresponds to the modulation section 15*g* and the transmission section 15*h* of the MMAC base station device 15. The transmission processing system includes a serial/parallel converter 371 to which transmission data is supplied, an inverse fast Fourier transform (IFFT) circuit 372 connected to the serial/parallel converter 371, an orthogonal modulator 374 connected to the IFFT circuit 372 through a D/A converter 373, and a power amplifier 376 connected to the orthogonal modulator 374 through a transmission mixer 375. The power amplifier 376 is connected to the transmission/receiving antenna 351 through the antenna switch 352.

To the receiving mixer 354 and the transmission mixer 375, an oscillation output f11 of a first local oscillator 355 is supplied. To the orthogonal detector 356 and the orthogonal modulator 374, an oscillation output f12 of a second local oscillator 357 is supplied. The oscillation frequencies of the first local oscillator 355 and the second local oscillator 357 are controlled by a control section 390, which corresponds to the central processing unit 15*e* of the MMAC base station device 15.

In the receiving processing system of the base station device 350 of such a structure, a received signal is inputted to the low-noise amplifier 353 from the transmission/receiving antenna 351 through the antenna switch 352. The low-noise amplifier 353 amplifies the received signal and supplies the signal to the receiving mixer 354. The receiving mixer 354 mixes the oscillation output f11 of the first local oscillator 355 with the received signal and converts the received signal of a predetermined frequency band f0 to an intermediate-frequency signal.

The intermediate-frequency signal obtained by the receiving mixer 354 is supplied to the orthogonal detector 356. The orthogonal detector 356 mixes the oscillation output f12 of the second local oscillator 357 with the intermediate-frequency signal and performs orthogonal wave detection on the intermediate-frequency signal, thus splitting the signal into an I-component and a Q-component. The I-component and Q-component detected by the orthogonal detector 356 are supplied to the A/D converters 360, 361 through the low-pass filters 358, 359, and are then converted to digital data $I_D$, $Q_D$ of the respective components by the A/D converters 360, 361. The first low-pass filter 358 is a filter having a passband width suitable for passing a multi-carrier signal with m subcarriers. The second low-pass filter 359 is a filter having a passband width suitable for passing a multi-carrier signal with j subcarriers.

The fast Fourier transform circuit 362 performs discrete Fourier transformation with m points (in this case, 32 points) equal to the maximum number of subcarriers with respect to the digital data $I_D$, $Q_D$ supplied from the A/D converter 360 and thus generates parallel data of m symbols. The parallel/serial converter 364 converts the parallel data of m symbols supplied from the fast Fourier transform circuit 359 to one sequence of serial data and supplies this serial data to the discrimination and selection circuit 370.

The fast Fourier transform circuit 363 performs discrete Fourier transformation with j points (in this case, eight points) with respect to the digital data $I_D$, $Q_D$ supplied from the A/D converter 361 and thus generates parallel data of j symbols (eight symbols). The parallel/serial converter 365 converts the parallel data of j symbols supplied from the second fast Fourier transform circuit 363 to one sequence of serial data and supplies this serial data to the discrimination and selection circuit 370.

The discrimination and selection circuit 370 discriminates which sequence of serial data of the two sequences of serial data supplied from the parallel/serial converters 364, 365 is the data considered to be correct received data, then selects the discriminated sequence of serial data as received data, and supplies the selected data to a data processing section 380, which corresponds to the MMAC channel coding/decoding section 15d of the base station device 15.

The signal processed in the system including the elements from the first low-pass filter 358 to the parallel/serial converter 364 and the signal processed in the system including the elements from the second low-pass filter 359 to the parallel/serial converter 365 will now be described.

The signal passed through the first low-pass filter 358 is a multi-carrier signal having m units (in this case, 32 units) of subcarriers sc1 to sc32, and the bandwidth fw1 of the received signal is the bandwidth for 32 subcarriers, as shown in FIG. 17A. The first low-pass filter 358 is a filter for passing the signal having this bandwidth. A bandwidth twice the bandwidth of the passband of the first low-pass filter 358 is the bandwidth fw1 of the received signal.

The signal passed through the second low-pass filter 359 is a multi-carrier signal having j units (in this case, eight units) of subcarriers sc1' to sc8', and the bandwidth fw2 of the received signal is the bandwidth for eight subcarriers, as shown in FIG. 17B. The second low-pass filter 359 is a filter for passing the signal having this bandwidth. A bandwidth twice the bandwidth of the passband of the second low-pass filter 359 is the bandwidth fw2 of the received signal. The center frequency of the passband of this second low-pass filter 359 can be arbitrarily set as long as this low-pass filter passes a multi-carrier signal with j units (in this case, eight units) of subcarriers sc1' to sc8' from among m units (in this case, 32 units) of subcarriers sc1 to sc32. However, in consideration of the system design, it is preferred to set a passband of $\pm\Delta$ from the carrier center frequency Fc of the multi-carrier signal with subcarriers sc1 to sc32 as the center frequency.

Meanwhile, in the transmission processing system in the base station device 350, transmission data (serial data) supplied from the data processing section 380 is converted to m units of parallel data by the serial/parallel converter 371. The inverse fast Fourier transform circuit 372 performs inverse discrete Fourier transformation with m points with respect to the m units of parallel data and thus generates digital baseband data $I_D$, $Q_D$ on the orthogonal time bases. The baseband data $I_D$, $Q_D$ are converted to the analog format by the D/A converter 373, thus obtaining analog signals of the I-component and Q-component.

The orthogonal modulator 374, to which the I-component and Q-component signals are supplied from the D/A converter 373, performs orthogonal modulation of the I-component and Q-component signals by using the oscillation output f12 of the second local oscillator 357 as a carrier wave. The signal orthogonally modulated by the orthogonal modulator 374 is mixed with the oscillation output f11 of the local oscillator 355 by the transmission mixer 375, thus frequency-converting the signal to a signal of a transmission frequency band. The frequency-converted signal is amplified by the power amplifier 376 and is then radio-transmitted to the terminal device 16 from the antenna 351 through the antenna switch 352.

The base station device 350 differs from the base station device 250 shown in FIG. 14 in that demodulation processing is carried out after band limitation with respect to the I-component and Q-component detected by the orthogonal detector 356 is carried out by the first low-pass filter 358 having the passband width suitable for passing a multi-carrier signal with m subcarriers and the second low-pass filter 359 having the passband width suitable for passing a multi-carrier signal with j subcarriers.

By using the base station device 350 of such a structure, both the receiving processing of low-speed access in the up link from the communication terminal device 16 and the receiving processing of high-speed access can be carried out, and the terminal device 16 of either mode can be applied. In this case, since the receiving processing of the signals having the respective numbers of subcarriers is carried out by passing the signals through the low-pass filters 358, 359 suitable for the respective transmission bandwidths, demodulation processing can be carried out on the received signals limited to the passband widths suitable for the respective number of subcarriers, and the demodulation of data having the respective number of subcarriers can be satisfactorily carried out with high sensitivity. Particularly, since the passband of the received signal is narrowed at the time of low-speed access, wasteful noise power and radio interference can be eliminated and the receiving sensitivity can be improved. As the receiving processing on the side of the base station device 15 can be carried out with high sensitivity, the burden on the power amplifier on the side of the terminal device 16 can be reduced and the power required for transmission in the terminal device 16 can be reduced. Also, out-of-band radio interference can be efficiently removed, thus enabling improvement in the receiving sensitivity.

The effect of improvement in the receiving sensitivity will now be described. The receiving sensitivity Ps (where the bit error rate is 1%) can be expressed by the following equation.

$$Ps=C/N[dB]+kTBF[dB]$$

In this equation, C/N is the ratio of carrier level C to noise level N where the bit error rate is 1%. This C/N value is determined in accordance with the modulation mode of each subcarrier and is basically independent of the number of subcarriers. In the equation, k is the Boltzmann's constant and T is the absolute temperature. At the normal temperature, kT=174 dBm/Hz is obtained. F is the noise factor (NF) of the receiver. B is the noise bandwidth of the receiver. If band limitation is carried out on the baseband, the noise bandwidth takes a value twice that of the passband of the low-pass filter. In the case where the value of B can be reduced to ¼ by reducing the subcarriers, as shown in FIGS. 17A and 17B, Ps can be set to ¼, that is, smaller by 6 dB since the other parameters are unchanged. This means that the sensitivity is improved by 6 dB. The improvement in the sensitivity by 6 dB means that the transmission power on the side of the terminal device 16 may be lowered by 6 dB.

In this embodiment, the number of subcarriers m is 32 and the number of subcarriers j is 8. However, the numbers of subcarriers are not limited to these numbers as long as the relation of m>j is satisfied. For example, the number of subcarriers j may be 1 so as to form a so-called single-carrier signal.

Moreover, though two low-pass filters having their respective bandwidth are provided in the base station device 350, a single low-pass filter having a variably set bandwidth may be provided so as to carry out variable processing of the output of the single low-pass filter in accordance with the number of subcarriers of received data, thus changing the passband width of the low-pass filter in accordance with the number of subcarriers of the received data. Particularly, in the case where it is known in advance that the current access is low-speed access or high-speed access, a system including a low-pass filter, an A/D converter, a fast Fourier transform circuit and a parallel/serial converter may be provided for one sequence alone so as to change the processing in each circuit in accordance with the number of subcarriers received at the time of processing.

In the above-described embodiment, the present invention is applied to the MMAC radio communication system. However, it is a matter of course that the processing of the present invention can be applied to various other data communication systems.

The invention claimed is:

1. A base station device for carrying out bidirectional data communication with a communication terminal device, the base station device comprising:
    transmission means for carrying out communication of a down link to the communication terminal device by using a multi-carrier signal having data dispersed to m units of subcarriers for transmission by applying an orthogonal frequency division multiplex (OFDM);
    receiving means for receiving a multi-carrier signal having the data dispersed to m or j units of subcarriers or for receiving a single-carrier signal transmitted from the communication terminal device and for demodulating the data thereof; and
    discrimination means for discriminating a received signal among the multi-carrier signal using m units of subcarriers, or the multi-carrier signal using only j units of subcarriers, or the single-carrier signal, such that demodulation process g conforming to a the received signal is carried out by the receiving means based upon a result of discrimination of the discrimination means, wherein
    m is an integer not smaller than 2; and
    j is an integer smaller than m,
    and including error detecting means for detecting errors in the received signal before the discriminating operation.

2. The base station device as claimed in claim 1, further comprising receiving control means for controlling the receiving means to receive the multi-carrier signal to which specified j units of subcarriers are allocated or to receive the single-carrier signal to which a predetermined subcarrier is allocated and to demodulate the data thereof.

3. The base station device as claimed in claim 1, further comprising receiving control means for controlling the receiving means to receive the multi-carrier signal transmitted with the data dispersed to m units of subcarriers-at a first slot timing set within a frame having a plurality of slots and demodulate the data thereof, to receive the multi-carrier signal transmitted with the data dispersed to j units of subcarriers, or to receive the single-carrier signal at second slot timing set within the frame and to demodulate the data thereof.

4. The base station device as claimed in claim 1, wherein the receiving means further includes a filter having a passband width corresponding to the number of subcarriers to be demodulated, to decode data from the received signal obtained through the filter.

5. The base station device as claimed in claim 1, wherein the receiving means further includes a filter having a first passband width and the filter having a second passband width broader than the first passband width, so as to receive the multi-carrier signal transmitted through the filter of the first passband width with the data dispersed to j units of subcarriers or the single-carrier signal and demodulate the data thereof, and to receive the multi-carrier signal transmitted through the filter of the second passband width with the data dispersed to m units of subcarriers and demodulate the data thereof.

6. A communication method for carrying out bidirectional communication with a base station device, the method comprising:
    carrying out communication of a down link from the base station device to a communication terminal device by using a multi-carrier signal having data dispersed to a plurality of subcarriers for transmission by applying an orthogonal frequency division multiplex (OFDM); and
    carrying out communication of an up link from the communication terminal device to the base station device by using a multi-carrier signal having data dispersed to a plurality of subcarriers for transmission or by using a single-carrier signal, wherein
    at the base station device the multi-carrier signal and the single-carrier signal are discriminated between such that demodulation processing conforming to a received signal is carried out based upon a result of discrimination, and including error detecting means for detecting errors in the received signal before carrying out the discrimination operation.

7. The communication method as claimed in claim 6, wherein the communication of the up link to the base station device is carried out by using a predetermined subcarrier of the plurality of subcarriers.

8. The communication method as claimed in claim 6, wherein communication between the base station device and the communication terminal device is carried out at a slot timing set within a frame having a plurality of slots, and
    the communication of the up link from the communication terminal device to the base station device is carried out by using the multi-carrier signal at a first slot timing set within the frame and by using the single-carrier signal at a second slot timing set within the frame.

9. A communication method for carrying out bidirectional communication with a base station device, the method comprising:
    carrying out communication of a down link from the base station device to a communication terminal device by using multi-carrier signal having data dispersed to m units of subcarriers for transmission by applying an orthogonal frequency division multiplex (OFDM);
    carrying out communication of an up link from the communication terminal device to the base station device by using a multi-carrier signal having data dispersed to j units of subcarriers for transmission or a multi-carrier signal having data dispersed to m units of subcarriers, wherein
    m is an integer not smaller than 2;
    j is an integer smaller than m; and
    on the side of the base station device the multi-carrier signal using m units of subcarriers and the multi-carrier signal using j units of subcarriers are discriminated between such that demodulation processing conforming to a received signal is carried out based upon a result of discrimination; and performing error detection before performing discrimination.

10. The communication method as claimed in claim 9, wherein communication between the base station device and the communication terminal device is carried out at a slot timing set within a frame having a plurality of slots, and communication of the up link from the communication terminal device to the base station device is carried out in a slot allocated only to the multi-carrier signal having the data dispersed to j units of subcarriers for transmission.

11. The communication method as claimed in claim 9, wherein the communication of the up link from the communication terminal device to the base station device is carried out by using the multi-carrier signal having data dispersed to m units of subcarriers at first slot timing set within a frame and by using the multi-carrier signal having data dispersed to j units of subcarriers at a second slot timing set within the frame.

12. A communication method for carrying out bidirectional communication with a base station device, the method comprising:

carrying out communication of a down link from the base station device to a communication terminal device by using a multi-carrier signal having data dispersed to m units of subcarriers for transmission by applying an orthogonal frequency division multiplex (OFDM);

carrying out the communication of an up link from the communication terminal device to the base station device by using a multi-carrier signal having the data dispersed to m units of subcarriers for transmission, a multi-carrier signal having the data dispersed to j units of subcarriers for transmission or a single-carrier signal, wherein m is an integer not smaller than 2;

j is an integer smaller than m; and on a side of the base station device the multi-carrier signal using m units of subcarriers and the multi-carrier signal using j units of subcarriers are discriminated between such that demodulation processing conforming to a received signal is carried out based upon a result of discrimination; and performing error detection before performing discrimination.

13. The communication method as claimed in claim 12, wherein communication between the base station device and the communication terminal device is carried out at slot timing set within a frame cycle, and communication of the up link from the communication terminal device to the base station device is carried out in a slot allocated only to the multi-carrier signal having the data dispersed to j units of subcarriers for transmission or the single-carrier signal.

14. The communication method as claimed in claim 12, wherein the communication of the up link from the communication terminal device to the base station device is carried out by using the multi-carrier signal having the data dispersed to m units of subcarriers at a first slot timing set within a frame and by using the multi-carrier signal having the data dispersed to units of subcarriers or the single-carrier signal at second slot timing set within the frame cycle.

\* \* \* \* \*